(12) United States Patent
Malik et al.

(10) Patent No.: US 10,904,773 B2
(45) Date of Patent: Jan. 26, 2021

(54) BEAM MANAGEMENT TECHNIQUES IN MILLIMETER WAVE SYSTEMS

(71) Applicant: QUALCOMM Incorporated, San Diego, CA (US)

(72) Inventors: Rahul Malik, San Diego, CA (US); Srinivas Yerramalli, San Diego, CA (US); Kaushik Chakraborty, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/123,899

(22) Filed: Sep. 6, 2018

(65) Prior Publication Data

US 2019/0082333 A1    Mar. 14, 2019

Related U.S. Application Data

(60) Provisional application No. 62/557,708, filed on Sep. 12, 2017.

(51) Int. Cl.
*H04W 24/02*    (2009.01)
*H04B 7/0408*   (2017.01)
(Continued)

(52) U.S. Cl.
CPC .......... *H04W 24/02* (2013.01); *H04B 7/0408* (2013.01); *H04B 7/063* (2013.01);
(Continued)

(58) Field of Classification Search
CPC . H04W 24/02; H04W 24/10; H04W 74/0833; H04B 7/0645; H04B 7/063; H04B 7/0695; H04B 7/0408
See application file for complete search history.

(56) References Cited

U.S. PATENT DOCUMENTS

2014/0010178 A1    1/2014   Yu et al.
2015/0289281 A1   10/2015   Kim et al.
(Continued)

FOREIGN PATENT DOCUMENTS

WO    WO-2014089090 A1    6/2014

OTHER PUBLICATIONS

International Search Report and Written Opinion—PCT/US2018/050026—ISA/EPO—dated Nov. 20, 2018.

*Primary Examiner* — Pao Sinkantarakorn
*Assistant Examiner* — Kabir U Jahangir
(74) *Attorney, Agent, or Firm* — Qualcomm IP Dept.; James Hunt Yancey, Jr.

(57) ABSTRACT

Methods, systems, and devices for wireless communications are described that provide for partitioning two or more dimensions of an uplink transmission, where different partitions in each partitioned dimension can be used to provide different feedback information. A UE may measure one or more downlink transmissions from a base station (e.g., beam measurements in a beam sweep procedure), and select a partition of one of the partitioned dimensions to indicate feedback related to the measured downlink transmissions. The feedback may indicate, for example, a particular beam that may be used for an active beam pair, beam refinement information, or other feedback. The partitioned dimensions may include one or more of time resource, a frequency resource dimension, a root sequence dimension, a cyclic shift dimension, a time-frequency dimension, or any combination thereof.

22 Claims, 17 Drawing Sheets

(51) Int. Cl.
*H04B 7/06* (2006.01)
*H04W 24/10* (2009.01)
*H04W 74/08* (2009.01)

(52) U.S. Cl.
CPC ......... *H04B 7/0645* (2013.01); *H04B 7/0695* (2013.01); *H04W 24/10* (2013.01); *H04W 74/0833* (2013.01)

(56) References Cited

U.S. PATENT DOCUMENTS

| | | | |
|---|---|---|---|
| 2019/0052334 A1* | 2/2019 | Jeon | H04B 7/0626 |
| 2019/0132066 A1* | 5/2019 | Park | H04W 36/0094 |
| 2019/0335510 A1* | 10/2019 | Ling | H04B 7/0695 |
| 2019/0356438 A1* | 11/2019 | Lee | H04B 7/0408 |

\* cited by examiner

BEAM MANAGEMENT TECHNIQUES IN MILLIMETER WAVE SYSTEMS

CROSS REFERENCES

The present Application for patent claims the benefit of U.S. Provisional Patent Application No. 62/557,708 by MALIK et al., entitled "BEAM MANAGEMENT TECHNIQUES IN MILLIMETER WAVE SYSTEMS," filed Sep. 12, 2017, assigned to the assignee hereof, and expressly incorporated herein.

BACKGROUND

The following relates generally to wireless communication, and more specifically to beam management techniques in millimeter wave (mmW) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In a mmW system, a base station and a UE may communicate via one or more directional beams. A transmitter (e.g., a base station) may engage in a beam sweeping procedure to establish an active beam pair with a receiver (e.g., a UE). An active beam pair may include an active transmit beam of the transmitter and a corresponding active receive beam of the receiver. The transmit beams and the receive beams in an active beam pair may be refined through, for example, beam refinement procedures. However, such beam refinement procedures may require multiple transmissions that each include multiple training symbols. Thus, the UE may remain in an awake mode expending power receiving and/or transmitting the multiple beam refinement transmissions, and the base station and UE may utilize resources during the refinement process. Furthermore, in some cases shared or unlicensed spectrum may be used for mmW transmissions, and access to such spectrum by a UE and transmitter may be subject to contention procedures (e.g., listen before talk (LBT) procedures), which can result in additional time for beam sweeping and refinement. Techniques that may provide more efficient sweeping and refinement, and feedback from the UE to the transmitter, may be desirable to help enhance network efficiency.

SUMMARY

The described techniques relate to improved methods, systems, devices, or apparatuses that support beam management in millimeter wave systems. Various described techniques provide for partitioning two or more dimensions of an uplink transmission, where different partitions in each partitioned dimension can be used to provide different feedback information. In some cases, a UE may measure one or more downlink transmissions from a base station (e.g., beam measurements in a beam sweep procedure), and select a partition of one of the partitioned dimensions to indicate feedback related to the measured downlink transmissions. The feedback may indicate, for example, a particular beam that may be used for an active beam pair, beam refinement information, or other feedback (e.g., scheduling request (SR) information). The partitioned dimensions may include one or more of a time resource dimension, a frequency resource dimension, a root sequence dimension, a cyclic shift dimension, a time-frequency dimension, or any combination thereof.

A method of wireless communication is described. The method may include measuring two or more downlink transmission beams from a transmitter in a beam sweep procedure, determining first feedback information and second feedback information based at least in part on the measuring, and transmitting an uplink communication that indicates the first feedback information and the second feedback information, wherein the uplink communication uses a first partition of a first partitioned dimension to indicate the first feedback information, and uses a second partition of a second partitioned dimension to indicate the second feedback information.

An apparatus for wireless communication is described. The apparatus may include means for measuring two or more downlink transmission beams from a transmitter in a beam sweep procedure, means for determining first feedback information and second feedback information based at least in part on the measuring, and means for transmitting an uplink communication that indicates the first feedback information and the second feedback information, wherein the uplink communication uses a first partition of a first partitioned dimension to indicate the first feedback information, and uses a second partition of a second partitioned dimension to indicate the second feedback information.

Another apparatus for wireless communication is described. The apparatus may include a processor, memory in electronic communication with the processor, and instructions stored in the memory. The instructions may be operable to cause the processor to measure two or more downlink transmission beams from a transmitter in a beam sweep procedure, determine first feedback information and second feedback information based at least in part on the measuring, and transmit an uplink communication that indicates the first feedback information and the second feedback information, wherein the uplink communication uses a first partition of a first partitioned dimension to indicate the first feedback information, and uses a second partition of a second partitioned dimension to indicate the second feedback information.

A non-transitory computer readable medium for wireless communication is described. The non-transitory computer-readable medium may include instructions operable to cause a processor to measure two or more downlink transmission beams from a transmitter in a beam sweep procedure, determine first feedback information and second feedback information based at least in part on the measuring, and transmit an uplink communication that indicates the first feedback information and the second feedback information, wherein the uplink communication uses a first partition of a first partitioned dimension to indicate the first feedback information, and uses a second partition of a second partitioned dimension to indicate the second feedback information.

In some examples of the method, apparatus, and non-transitory computer-readable medium described above, the different partitions in each partitioned dimension correspond to different feedback information. In some examples of the method, apparatus, and non-transitory computer-readable medium described above, the measuring the two or more downlink transmission beams includes receiving each of the two or more downlink transmission beams in an associated synchronization signal (SS) block transmission, and the first downlink transmission beam may be associated with a first SS block transmission.

In some examples of the method, apparatus, and non-transitory computer-readable medium described above, the two or more downlink transmission beams each include at least a first beamformed signal and a second beamformed signal, the first beamformed signal and the second beamformed signal having different beamforming parameters, the first feedback information indicates a first downlink transmission beam of the two or more downlink transmission beams based at least in part on measurements of the two or more downlink transmission beams, and the second feedback information indicates beam refinement information based at least in part on measurements of the first beamformed signal and the second beamformed signal within the first downlink transmission beam.

In some examples of the method, apparatus, and non-transitory computer-readable medium described above, the first beamformed signal and the second beamformed signal within the first downlink transmission beam may be transmitted in different tone beams each corresponding to a different beam direction of the first SS block transmission, and the beam refinement information may be based at least in part on a measured gain of each of the different tone beams. In some examples of the method, apparatus, and non-transitory computer-readable medium described above, the second feedback information includes scheduling request information.

In some examples of the method, apparatus, and non-transitory computer-readable medium described above, the first partitioned dimension and the second partitioned dimension include partitions in one or more of a time resource dimension including a set of available time resources for the uplink transmission, a frequency resource dimension including set of available frequency resources for the uplink transmission, a root sequence dimension including a set of root sequences available for the uplink transmission, a cyclic shift dimension including a set of cyclic shifts available for the uplink transmission, a time-frequency dimension that includes a set of time-frequency resources available for the uplink transmission, or any combination thereof. In some examples of the method, apparatus, and non-transitory computer-readable medium described above, the frequency resource dimension includes independent or overlapping frequency resources associated with two or more partitions within the set of available frequency resources.

In some examples of the method, apparatus, and non-transitory computer-readable medium described above, the uplink transmission comprises a random access channel (RACH) message having a sequence derived from at least one of a set of root sequences, a set of cyclic shifts, a set of time-frequency resources, or any combination thereof, the first partitioned dimension includes a set of RACH resources for transmitting the RACH message, and the first partition corresponds to a first RACH resource of the set of RACH resources associated with the first downlink transmission beam, and the second partitioned dimension includes two or more partitions in the set of root sequences, the set of cyclic shifts, the set of time-frequency resources, or any combination thereof.

Some examples of the method, apparatus, and non-transitory computer-readable medium described above may further include processes, features, means, or instructions for receiving configuration information that indicates the two or more partitioned dimensions and a range of feedback values associated each partition of each partitioned dimension. In some examples of the method, apparatus, and non-transitory computer-readable medium described above, the configuration information may be received in a system information block (SIB).

A method of wireless communication is described. The method may include transmitting two or more downlink transmission beams to a receiver in a beam sweep procedure, receiving an uplink transmission from the receiver that includes first feedback information that indicates a first downlink transmission beam of the two or more downlink transmission beams and second feedback information that indicates beam refinement information associated with the first downlink transmission beam, where two or more partitions of a first partitioned dimension of the uplink transmission provide the first feedback information and two or more partitions of a second partitioned dimension of the uplink transmission provide the second feedback information, and communicating with the receiver based at least in part on the first feedback information and the second feedback information.

An apparatus for wireless communication is described. The apparatus may include means for transmitting two or more downlink transmission beams to a receiver in a beam sweep procedure, means for receiving an uplink transmission from the receiver that includes first feedback information that indicates a first downlink transmission beam of the two or more downlink transmission beams and second feedback information that indicates beam refinement information associated with the first downlink transmission beam, where two or more partitions of a first partitioned dimension of the uplink transmission provide the first feedback information and two or more partitions of a second partitioned dimension of the uplink transmission provide the second feedback information, and means for communicating with the receiver based at least in part on the first feedback information and the second feedback information.

Another apparatus for wireless communication is described. The apparatus may include a processor, memory in electronic communication with the processor, and instructions stored in the memory. The instructions may be operable to cause the processor to transmit two or more downlink transmission beams to a receiver in a beam sweep procedure, receive an uplink transmission from the receiver that includes first feedback information that indicates a first downlink transmission beam of the two or more downlink transmission beams and second feedback information that indicates beam refinement information associated with the first downlink transmission beam, where two or more partitions of a first partitioned dimension of the uplink transmission provide the first feedback information and two or more partitions of a second partitioned dimension of the uplink transmission provide the second feedback information, and communicate with the receiver based at least in part on the first feedback information and the second feedback information.

A non-transitory computer readable medium for wireless communication is described. The non-transitory computer-readable medium may include instructions operable to cause a processor to transmit two or more downlink transmission beams to a receiver in a beam sweep procedure, receive an uplink transmission from the receiver that includes first feedback information that indicates a first downlink transmission beam of the two or more downlink transmission beams and second feedback information that indicates beam refinement information associated with the first downlink transmission beam, where two or more partitions of a first partitioned dimension of the uplink transmission provide the first feedback information and two or more partitions of a second partitioned dimension of the uplink transmission provide the second feedback information, and communicate with the receiver based at least in part on the first feedback information and the second feedback information.

In some examples of the method, apparatus, and non-transitory computer-readable medium described above, each of the two or more downlink transmission beams is transmitted in an associated synchronization signal (SS) block transmission, and the first partitioned dimension includes a set of uplink time resources for transmitting the uplink transmission, each uplink time resource corresponding to a different partition of the first partitioned dimension, and each uplink time resource may be associated with an SS block transmission.

In some examples of the method, apparatus, and non-transitory computer-readable medium described above, the two or more downlink transmission beams include at least a first beamformed signal and a second beamformed signal, the first beamformed signal and the second beamformed signal having different beamforming parameters, and the second feedback information indicates beam refinement information associated with the first beamformed signal and the second beamformed signal. In some examples of the method, apparatus, and non-transitory computer-readable medium described above, the first beamformed signal and the second beamformed signal may be transmitted in different tone beams that each correspond to a different beam direction of the associated SS block transmission, and the beam refinement information indicates a selected tone beam.

In some examples of the method, apparatus, and non-transitory computer-readable medium described above, the two or more partitioned dimensions include partitions in one or more of a time resource dimension that includes a set of available time resources for the uplink transmission, a frequency resource dimension including set of available frequency resources for the uplink transmission, a root sequence dimension including a set of root sequences available for the uplink transmission, a cyclic shift dimension including a set of cyclic shifts available for the uplink transmission, a time-frequency dimension that includes a set of time-frequency resources available for the uplink transmission, or any combination thereof.

In some examples of the method, apparatus, and non-transitory computer-readable medium described above, the frequency resource dimension includes independent or overlapping frequency resources associated with two or more partitions within the set of available frequency resources.

In some examples of the method, apparatus, and non-transitory computer-readable medium described above, the uplink transmission comprises a random access channel (RACH) message having a sequence derived from at least one of a set of root sequences, a set of cyclic shifts, a set of time-frequency resources, or any combination thereof, and the first partitioned dimension includes a set of RACH resources for transmitting the RACH message, and a first partition of the first partitioned dimension corresponds to a first RACH resource of the set of RACH resources associated with a first downlink transmission beam, and the second partitioned dimension includes two or more partitions in the set of root sequences, the set of cyclic shifts, the set of time-frequency resources, or any combination thereof.

Some examples of the method, apparatus, and non-transitory computer-readable medium described above may further include processes, features, means, or instructions for transmitting configuration information that indicates the two or more partitioned dimensions and a range of feedback values associated each partition of each partitioned dimension. In some examples of the method, apparatus, and non-transitory computer-readable medium described above, the configuration information may be transmitted in a system information block (SIB).

DETAILED DESCRIPTION

Figure 1:
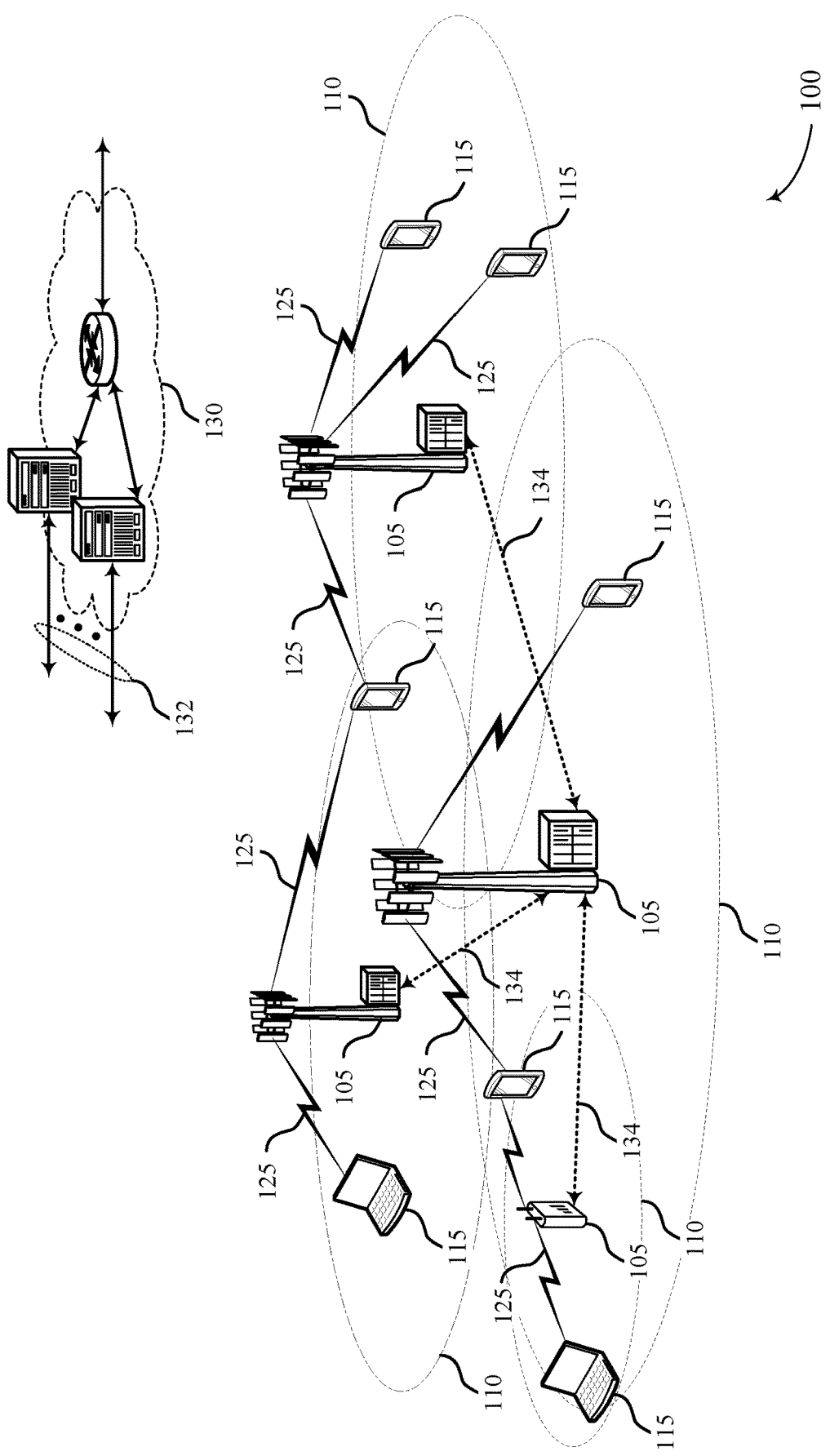
FIG. 1 illustrates an example of a system for wireless communication that supports beam management techniques in millimeter wave systems in accordance with aspects of the present disclosure.

Various described techniques provide for transmission of feedback information from a user equipment (UE) to a transmitter (e.g., a base station) using relatively few transmission resources. Described techniques provide for partitioning two or more dimensions of an uplink transmission, where different partitions in each partitioned dimension can be used to provide different feedback information. The feedback may indicate, for example, a particular beam of a millimeter wave (mmW) system that may be used for an active beam pair, beam refinement information, or other feedback (e.g., scheduling request (SR) information). The partitioned dimensions may include one or more of time resource dimension, a frequency resource dimension, a root sequence dimension, a cyclic shift dimension, a time-frequency dimension, or any combination thereof.

In some cases, two or more partitioned dimensions may be used to provide feedback from a UE related to beam selection and refinement in a mmW system. As indicated above, in mmW systems a base station and UE may communicate via one or more directional beams, and a base station may engage in a beam sweeping operation to establish an active transmit beam with a UE. A base station may also engage in beam tracking to maintain a connection with a UE. In some cases, the base station, as part of the beam sweep procedure, may perform a sector sweep with wide-formed, lower gain beams to establish a primary connection. Then, the base station may perform beam refinement using narrower, higher gain beams, and the UE may identify a transmit beam on which subsequent communications should be performed. The base station may perform a continuous beam tracking process by adjusting the refined beam to maintain the improved connection. In some cases, such beam refinement procedures may require multiple transmissions including multiple training symbols. In other cases, the base station may transmit beamformed signals for beam refinement along with wide-formed, lower gain beams.

In some cases, consecutive beams may be transmitted by a base station in a beam sweeping operation in consecutive synchronization signal (SS) blocks. A relatively wide-formed beam may be transmitted to a particular sector or geographic area in a SS block, and then a subsequent beam may be transmitted to another sector or geographic area in a subsequent SS block. In some cases, each SS block has associated uplink resources, and a UE may transmit an uplink transmission, such as a random access request using a random access channel (RACH) in the uplink resources associated with the SS block in which the UE received the strongest downlink beam. Thus, the different uplink resources associated with different beams in a beam sweeping procedure may provide a time resource partition, and the UE transmission in a particular uplink resource may provide feedback to the base station of the wide-formed beam that the UE received with the highest gain, for example.

As indicated above, in some cases a base station may transmit signals that may be used for beam refinement within a wide-formed, lower-gain beam. In such cases, the base station may transmit multiple beamformed signals in different frequency tones, with such different tone beams each corresponding to a different beam direction of the SS block transmission within the overall relatively wide-formed beam. A UE may measure the gain from multiple of the different tone beams, and determine beam refinement feedback based on the measurements. In some cases, the identification and reporting of the wide-formed beam may be referred to as a P1 procedure, and the identification of beam refinement information associated with the narrower-formed higher-gain tone beams may be referred to as a P2 procedure. In some cases, a subsequent P3 procedure may also be performed in which the UE may refine receive beamforming parameters. In some cases, a base station may transmit multiple downlink transmissions and the UE may adjust receive beamforming parameters to perform the receive beam refinement.

Various aspects of the present disclosure, as indicated above, provide multiple partitioned dimensions for uplink transmission, with different partitions indicating different feedback from a base station. As discussed above, in some cases a time partition may be used to indicate a wide-formed beam selected by a UE. In some cases, uplink transmissions within each time partition may include multiple partitions that may be used to indicate further feedback information. For example, different frequency partitions may be identified, and a UE transmission within a particular frequency partition may indicate beam refinement feedback in which a UE may indicate a selected higher-gain tone beam (e.g., a tone beam with the highest measured gain at the UE). Other partitioned dimensions may be used in addition to or instead of a frequency partition. For example, partitioned dimensions may include one or more of time resource partitions (e.g., further time resource partitions within uplink time resources associated with a SS block), a frequency resource dimension, a root sequence dimension, a cyclic shift dimension, a time-frequency dimension, or any combination thereof. Furthermore, such partitions may be used to provide feedback from a UE other than beam refinement feedback (e.g., SR information, neighbor cell information, buffer status information, etc., where values for particular feedback may be mapped to different partitions of one or more partitioned dimensions).

Providing such feedback using partitioned dimensions may allow a single uplink transmission to convey information that may otherwise be conveyed in one or more other uplink transmissions. Reducing the number of uplink transmissions in such cases may allow for enhanced efficiency in the use of wireless resources and reduced power consumption at a UE, for example. Furthermore, in cases where a UE is moving within a system, such feedback may allow for more accurate information (e.g., more accurate beam refinement feedback) that may be used in transmitting subsequent transmissions which may provide enhanced likelihood of successful receipt of transmitted data at the UE and base station. Additionally, in cases where mmW transmissions use a shared or unlicensed frequency spectrum band, a reduced number of transmissions between a UE and a base station is beneficial because it reduces the likelihood that a feedback procedure will be interrupted in the event that a different transmitter obtains the wireless channel.

Aspects of the disclosure are initially described in the context of a wireless communications system. Aspects of the disclosure are then illustrated by examples of wireless communications systems, and process flows. Aspects of the disclosure are further illustrated by and described with reference to apparatus diagrams, system diagrams, and flowcharts that relate to beam management techniques in millimeter wave systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network (also referred to as a 4G network), or a New Radio (NR) network (also referred to as a 5G network). In some cases, wireless communications system 100 may support enhanced broadband communications, ultra-reliable (i.e., mission critical) communications, low latency communications, and communications with low-cost and low-complexity devices. Wireless communications system 100 may support mmW transmissions, beam refinement techniques, and feedback techniques using partitioned dimensions of an uplink transmission, as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). In such cases, a first UE 115 may be a transmitter and another UE 115 may be a receiver. One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, such as in the range of 300 MHz to 300 GHz. In some cases, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may use mmW communications between UEs 115 and base stations 105, which may use beamforming techniques for transmitting and receiving transmissions. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both. In some cases, mmW transmissions may use an unlicensed high frequency band and a separate anchor carrier may be established in a lower band.

As indicated above, some signals (e.g., synchronization signals, reference signals, beam selection signals, or other control signals) may be transmitted by a base station 105 multiple times in different directions in a beam sweep operation, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

As indicated above, in some cases uplink transmissions from a UE 115 to a receiver (e.g., a base station 105) may have two or more partitioned dimensions, where different partitions in each partitioned dimension can be used to provide different feedback information. The feedback may indicate, for example, a particular beam that may be used for an active beam pair, beam refinement information, or other feedback (e.g., scheduling request (SR) or other information). The partitioned dimensions may include one or more of time resource, a frequency resource dimension, a root sequence dimension, a cyclic shift dimension, a time-frequency dimension, or any combination thereof.

Figure 2:
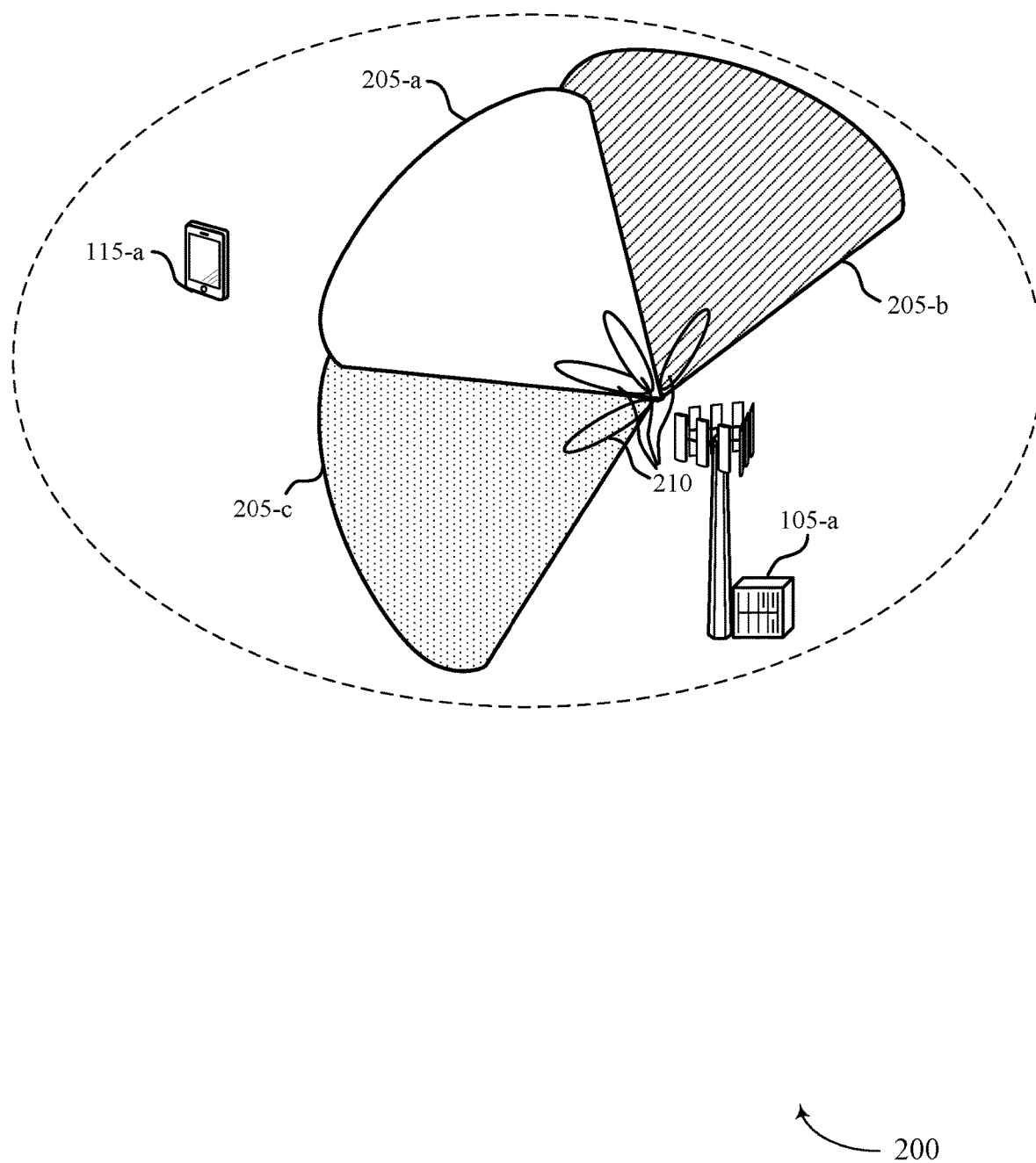
FIG. 2 illustrates an example of a wireless communications system that supports beam management techniques in millimeter wave systems in accordance with aspects of the present disclosure.

FIG. 2 illustrates an example of a wireless communications system 200 that supports beam management techniques in millimeter wave systems in accordance with various aspects of the present disclosure. Wireless communications system 200 may include a base station 105-a and a UE 115-a, which may be examples of the corresponding devices described with reference to FIG. 1. Base station 105-a and UE 115-a may communicate using one or more directional beams. In wireless communications system 200, a transmitter (e.g., base station 105-a) may engage in a beam sweeping operation to establish an active transmit beam with a receiver (e.g., UE 115-a), or beam tracking to maintain a connection with the receiver (e.g., UE 115-a).

In some examples, base station 105-a may engage in a beam sweeping operation to establish an active transmit beam with UE 115-a. In some examples, base station 105-a may also engage in a beam tracking procedure to maintain a connection with UE 115-a. Additionally, base station 105-a may transmit multiple beam refinement signals. For example, base station 105-a may transmit a relatively wide-formed beams 205 (e.g., analog beams), that may be transmitted towards different sectors or geographic directions. In the example if FIG. 2, a first wide-formed beam 205-a may be transmitted in a first direction, a second wide-formed beam 205-b may be transmitted in a second direction, and a third wide-formed beam 205-c may be transmitted in a third direction. In some examples, the gain across a plurality of tones corresponding to wide-formed beams 205 may be close to equal.

In some cases, wide-formed beams 205 may not be narrow enough or have a high enough gain to be a preferred directional transmit beam. Transmissions from UE 115-a may be more clearly received and decoded if received via a highly directional and refined transmit beam. Therefore, it may be beneficial for base station 105-a and base station 105-a to use beam refinement to generate narrower beamformed signals of refined beams 210, which may have a narrower coverage area but higher gain. UE 115-a may identify which of the refined beams 210 is received at the highest gain, and is therefore the preferred refined beam for subsequent transmissions. In some cases, the UE 115-a may provide feedback in a single random access request that indicates which of the wide-formed beams 205 and which of the refined beams 210 has a highest gain, or acceptable gain.

In some cases, each wide-formed beam 205 may be associated with an SS block in which synchronization signals (e.g., a primary synchronization signal (PSS) and a secondary synchronization signal (SSS)) and physical broadcast channel (PBCH) transmissions may be transmitted in the corresponding beam direction. In some cases, the SS block may indicate an uplink transmission resource that UE 115-a may use for a random access transmission. In some cases, the random access transmission may be a RACH message-1 (MSG1) transmission that may indicate that the UE 115-a has uplink data to transmit or that the UE 115-a desires to establish a connection with the base station 105-a. Such RACH MSG1 may occupy a fraction of the entire system bandwidth, and in some cases, frequency resources for the uplink transmission may be partitioned, and a selected partition may be used to convey information (e.g., feedback information from the UE 115-a). For contention based random access, some NR systems provide uplink resource associated with an SS block and other information (e.g., a subset of RACH resources and/or preamble indices) that may be configured by a set of parameters in a master information block (MIB), system information block (SIB), remaining minimum system information (RMSI), or combinations thereof. By partitioning the uplink resources as discussed herein, such a RACH MSG1 transmission may be overloaded with one or more other pieces of feedback information from the UE 115-a (e.g., beam refinement information) which may help to limit the number of uplink accesses as well as the amount of information that is sent, which may help to enhance network efficiency, power consumption, and reduce the likelihood of losing medium access in a shared spectrum system with contention-based medium access.

Figure 3:
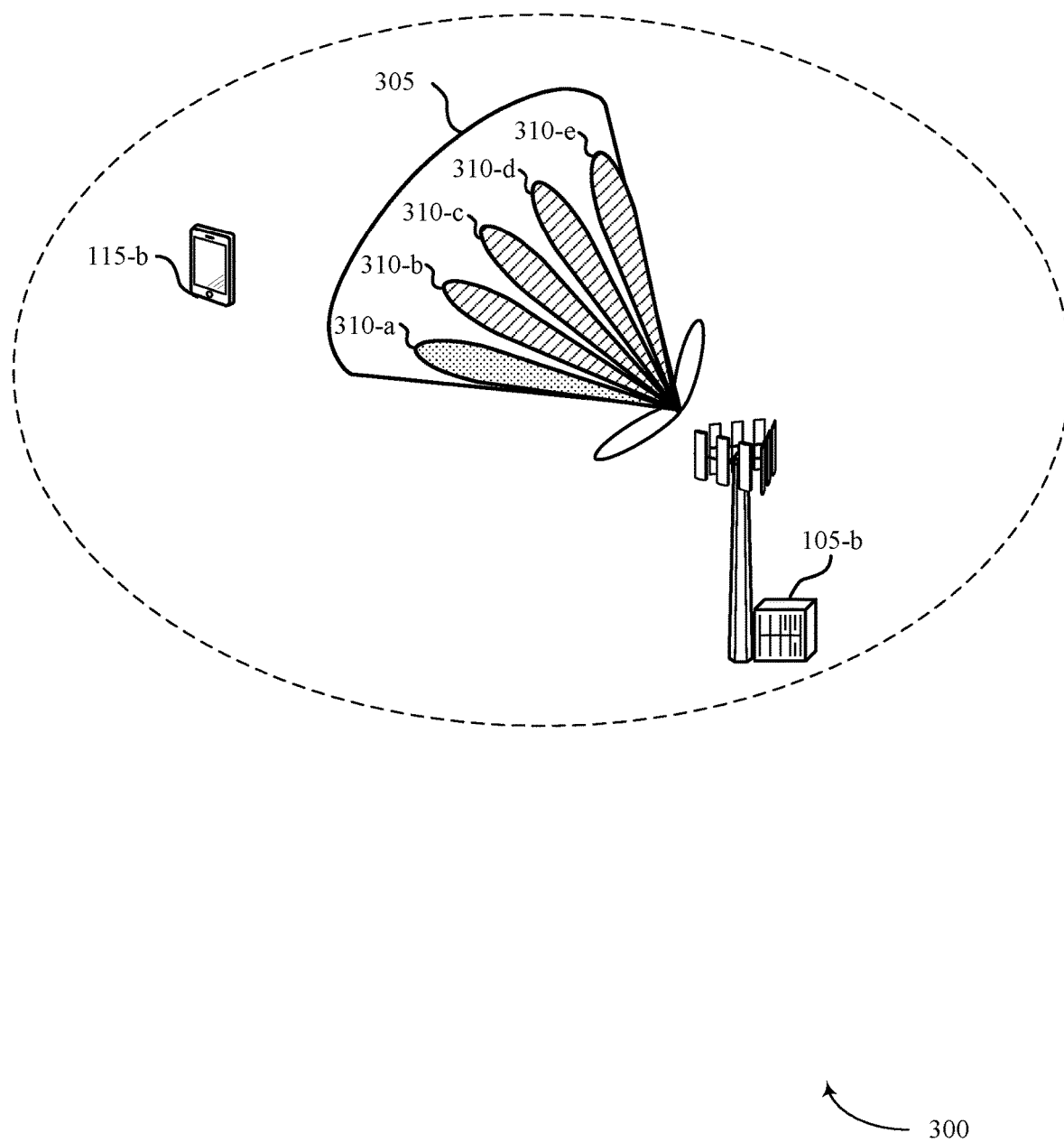
FIG. 3 illustrates another example of a wireless communications system that supports beam management techniques in millimeter wave systems in accordance with aspects of the present disclosure.

FIG. 3 illustrates an example of a wireless communications system 300 that supports beam management techniques in millimeter wave systems in accordance with various aspects of the present disclosure. Wireless communications system 300 may include a base station 105-*b* and a UE 115-*b*, which may be examples of the corresponding devices described with reference to FIGS. 1-2.

As indicated above, in some cases a beam refinement procedure (e.g., a P2 procedure) may be used to identify a preferred refined transmit beam. In some cases, a transmitter (e.g., base station 105-*b*) may use a first port to transmit a wide beam 305, which may be formed using analog beamforming, in a first transmission. The analog beam may be beamformed to create a geographic sector in a spatial direction corresponding to UE 115-*b* (e.g., where UE 115-*b* is geographically located). To generate and identify a refined transmit beam, base station 105-*b* may modulate (e.g., phase modulate or amplitude modulate) a beam refinement symbol, and transmit the modulated beam refinement symbol via a second port. The transmission of the first signal and the second, phase-modulated signal may result in a combined signal such that corresponding aspects, such as tones, are beamformed in one or more directions that at least partly overlap with the geographic sector of wide beam 305. By transmitting the combined signal, base station 105-*b* may generate one or more beam-formed refined beams, such as tone beams 310. Each refined tone beam 310 may correspond to a different tone and to a different spatial direction. For example, tone beam 310-*a* may correspond to a first tone and a first direction, whereas tone beam 310-*b* may correspond to a second tone and a second direction and so forth. In such examples, each tone beam 310 may vary with respect to gain at a particular geographic location. The one or more tone beams 310 may completely or partially overlap with the geographic sector of wide beam 305. In some examples, the tone beams 310 may be referred to as beamformed signals, and may be transmitted as a part of a sector sweep or beam sweep operation.

In some cases, prior to transmitting the combined signal, base station 105-*b* may transmit a reference combined signal. The reference combined signal may include a first signal transmitted via the first port, and a second signal transmitted via the second port. The first signal transmitted via the first port may be a wide analog beam. The second signal transmitted via the second port may be phase-modulated by some reference modulation. For example, the reference modulation may be a modulation of zero, such that the second signal is not phase-modulated at all with respect to the first signal. Alternatively, the reference modulation may be a non-zero phase-modulation, such that the second signal is modulated (e.g., phase modulated or amplitude modulated) with respect to the first signal. Base station 105-*b* may transmit the resulting reference combined signal at a first time instance, and may transmit the combined signal at a second instance in time. UE 115-*b* may receive the reference combined signal, and then receive the combined signal, such that measurements of the combined signal may be made with respect to the reference combined signal.

Base station 105-*b* may control the direction of each tone beam 310 resulting from the combined signal by altering the phase of the transmission via the second port. UE 115-*b* may measure the gain of each tone beam 310 (e.g., with respect to a previously received reference combined beam or with respect to other tone beams 310). In some examples, the transmitter may send groups of tones in a single direction. For example, the tones may be frequency interleaved or block interleaved. UE 115-*b* may determine a preferred tone beam 310 for subsequent transmissions. Subsequent transmissions from base station 105-*b* may be sent via the identified tone beam 310. As indicated above, various techniques provided herein allow the UE 115-*b* to report feedback related to both the wide beam 305 and an identified tone beam 310 in a single uplink transmission using two or more partitioned dimensions.

Figure 4:
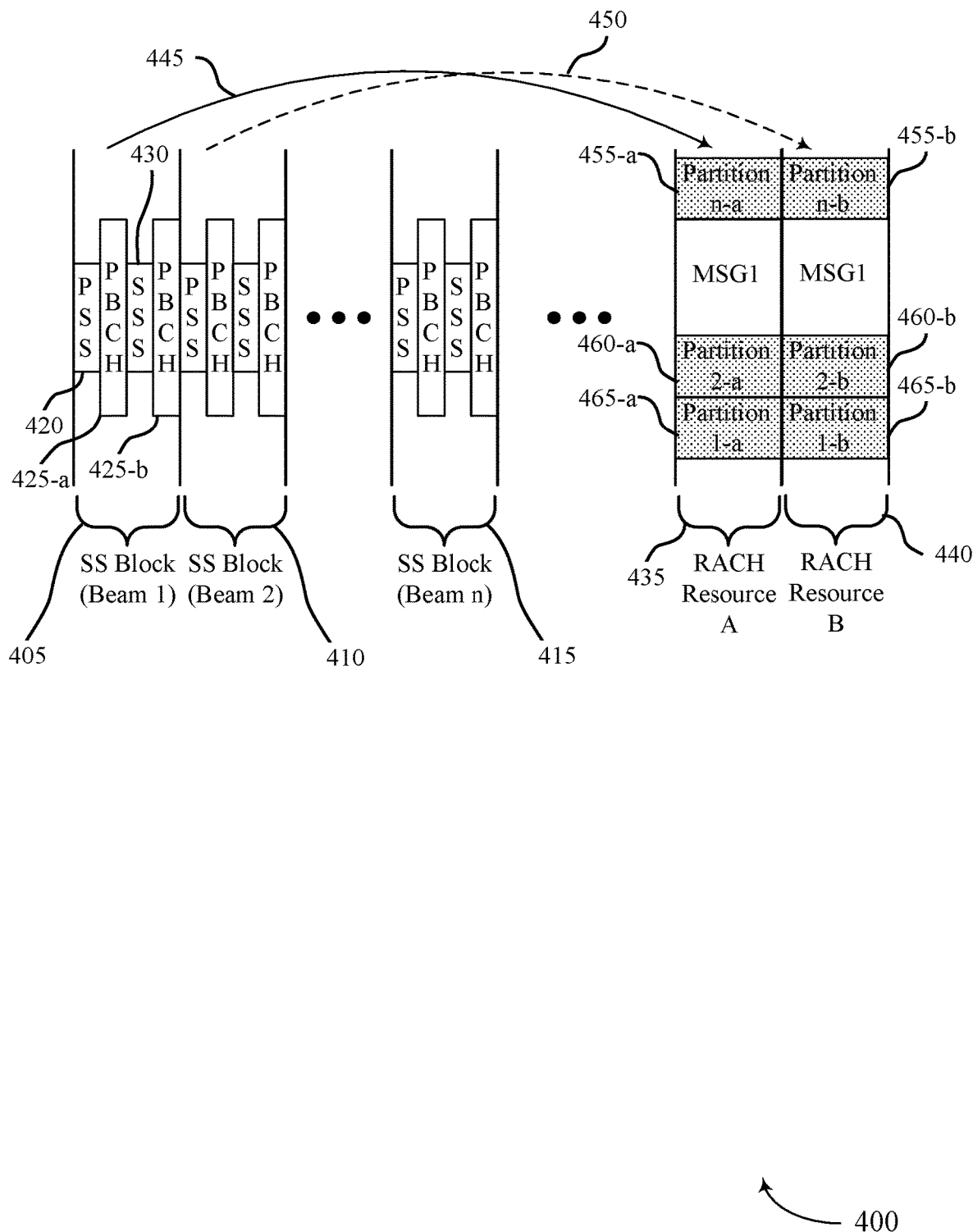
FIG. 4 illustrates an example of a partitioned dimension that support beam management techniques in millimeter wave systems in accordance with aspects of the present disclosure.

FIG. 4 illustrates an example of partitioned dimensions 400 that support beam management techniques in millimeter wave systems in accordance with aspects of the present disclosure. In some examples, partitioned dimensions 400 may be used to implement aspects of wireless communications systems 100, 200, or 300. As discussed above, in some cases a base station may transmit multiple wide beam downlink transmissions in a beam sweep operation, in which each wide beam may be transmitted in an SS block. In the example of FIG. 4, a first SS block 405 may be an SS block for a first beam, a second SS block 410 may be for a second beam, and an n-th SS block 415 may be for an n-th beam.

The base station, within each SS block 405-415, may transmit synchronization information in the form of a PSS 420 and an SSS 430, and PBCH transmissions 425, which may be divided into a first PBCH transmission 425-*a* and a second PBCH transmission 425-*b*. In some cases, each SS block 405-415 may have an associated uplink transmission resource. In the example of FIG. 4, the first SS block 405 may correspond to a first uplink resource 435, indicated as RACH resource A, and the second SS block 410 may correspond to a second uplink resource 440, indicated as RACH resource B. In some cases, the PBCH transmissions 425 may include information that allows a UE to identify uplink resources, and first SS block 405 may include first resource information 445 that indicates an associated uplink RACH transmission should be transmitted in first uplink resources 435, and second SS block 410 may include second resource information 450 that indicates an associated uplink RACH transmission should be transmitted in second uplink resources 440.

Accordingly, the different uplink resources 435-440 may support transmissions using different time resources, and thus such time resources may be a first partitioned dimension with each different time resource corresponding to a partition in the first partitioned dimension. A base station that receives an uplink transmission using the first uplink resource 435 may determine that the UE that transmitted the transmission prefers the beam associated with the first SS block 405 transmission. Of course, different dimensions may be partitioned that may indicate a SS block selection by a UE, such as different frequency resources associated with different SS blocks, for example.

As discussed above, in some cases a UE may also report one or more other pieces of information or feedback through an uplink transmission using one or more other partitioned dimensions. In the example of FIG. 4, a number of partitions are illustrated, and each uplink resource 435-440 includes a first partition (partition 1) 465, a second partition (partition 2) 460, and an n-th partition (partition n) 455. In this example, the partitions 455-465 may be partitions in the frequency domain. A UE may select one of these partitions 455-465 to provide feedback information to the base station. For example, in cases where the base station may transmit multiple tone beams in each SS block, a UE may measure the tone beams to determine beam refinement feedback information. Each of the partitions 455-465 may be mapped to a particular beam refinement feedback (e.g., the first partition 465 may be mapped to a first tone beam and the second partition 460 may be mapped to a second tone beam), and an uplink transmission from the UE using one of the partitions may indicate to the base station the beam refinement feedback.

While frequency partitions are illustrated in FIG. 4, other dimensions of an uplink transmission may be partitioned, in addition to or alternatively to such frequency partitions. For example, in some cases random access sequences may be derived from permutations of a root sequence, cyclic shifts, and different time-frequency resources, which may be indicated via means of a SIB from the base station. A UE receiving this information may randomize across all available dimensions to transmit a random access request (e.g., a RACH MSG1). In some cases, such dimensions for selecting random access sequences may be partitioned to allow for a random access transmission to be overloaded with additional information (e.g., beam refinement feedback). Thus, in the example of FIG. 4, a UE may measure one or more aspects associated with the transmission beam received in the first SS block 405 and the second SS block 410, which may include measurements to two or more tone beams transmitted in each downlink transmission, and select a second partition 460-b in the second uplink resource 440 for an uplink transmission. The base station may receive the uplink transmission from the UE (e.g., a RACH MSG1 transmission) and identify that it is received in the second partition 460-b of the second uplink resource 440. The base station may thus determine that the second tone beam of the second SS block 410 has been indicated by the UE as having a highest gain among gain measurements of the UE, for example.

In such a case, the UE may randomize the other dimensions of the uplink transmission in order to randomize the transmission across multiple UEs. The base station may then transmit a random access response (e.g., a RACH MSG2) to the UE either on a common wide beam or on a narrower refined beam, and the UE may transmit a subsequent uplink transmission (e.g., a RACH MSG3 transmission) using the refined beam that was indicated by the feedback provided by the UE. In some cases that partition frequency resources, the frequency dimension may be partitioned into overlapping frequency domain resources, or into non-overlapping frequency domain resources. As mentioned, in some cases different dimensions of the uplink transmission may be partitioned. Further, in some cases, the time dimension may be further partitioned, such that each tone beam of an SS block may have a corresponding uplink resource in time for the uplink transmission. In some cases, the partitions of the one or more dimensions for the uplink transmission may be signaled to the UE, such as in a MIB, SIB, RMSI, or combinations thereof, all or a portion of which may be transmitted in PBCH transmissions 425.

Figure 5:
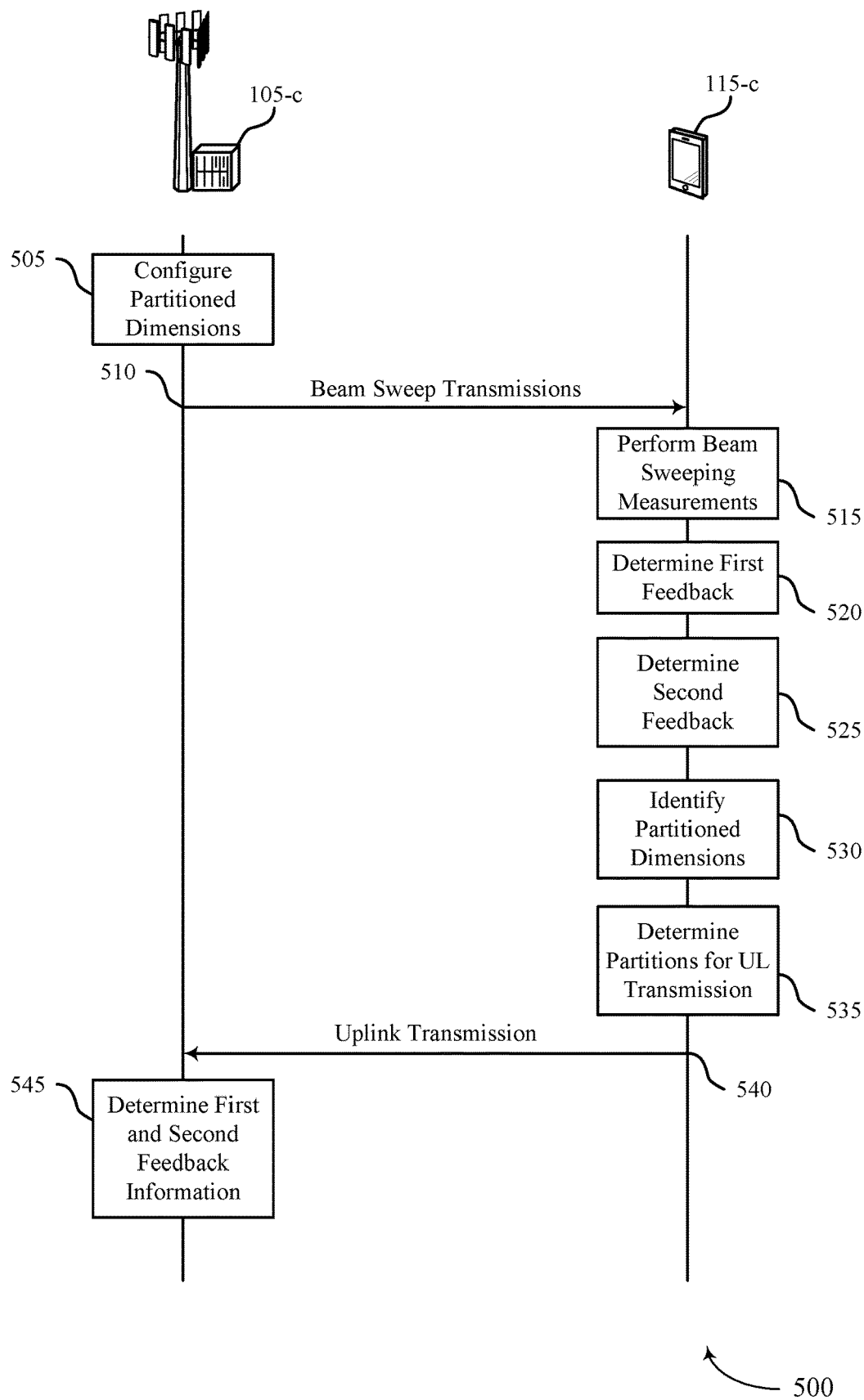
FIG. 5 illustrates an example of a process flow that supports beam management techniques in millimeter wave systems in accordance with aspects of the present disclosure.

FIG. 5 illustrates an example of a process flow 500 that supports beam management techniques in millimeter wave systems in accordance with various aspects of the present disclosure. In some examples, process flow 500 may implement aspects of wireless communications systems 100, 200, or 300. Process flow 500 may include the transmission of wide beams and tone beams from base station 105-c, and feedback from UE 115-c.

Initially, at block 505, the base station 105-c may configure one or more partitioned dimensions. As discussed above, the one or more partitioned dimensions may be used to provide feedback information in an uplink transmission. In some cases, the one or more partitioned dimensions may include one or more of a time resource dimension including a set of available time resources for the uplink transmission, a frequency resource dimension including set of available frequency resources for the uplink transmission, a root sequence dimension including a set of root sequences available for the uplink transmission, a cyclic shift dimension including a set of cyclic shifts available for the uplink transmission, a time-frequency dimension that includes a set of time-frequency resources available for the uplink transmission, or any combination thereof. In some cases, the frequency resource dimension includes independent or overlapping frequency resources associated with two or more partitions within the set of available frequency resources. The base station 105-c may configure the different partitioned dimensions based on an amount of resources available for each dimension (e.g., a frequency bandwidth for the associated uplink transmission), and provide an indication in, for example, MIB/SIB/RMSI transmissions.

The base station 105-c may transmit beam sweep transmissions 510 to one or more UEs, including UE 115-c. In some cases, the beam sweep transmissions each may be associated with an SS block in which synchronization signals (e.g., a primary synchronization signal (PSS) and a secondary synchronization signal (SSS)) and physical broadcast channel (PBCH) transmissions may be transmitted in the corresponding beam direction. In some cases, the SS block may indicate an uplink transmission resource that UE 115-c may use for a random access transmission. In some cases, one or more tone beams may be transmitted in each SS block transmission, which may be used for beam refinement.

At block 515, the UE 115-c may perform beam sweeping measurements. The beam sweeping measurements may include, for example, gain measurements made by the UE 115-c to measure a gain associated with each SS block transmission. In some cases, the beam sweeping measurements may include measuring the gain of each tone beam (e.g., with respect to a previously received reference combined beam or with respect to other tone beams) transmitted in an SS block.

At block 520, the UE 115-c may determine first feedback information. In some cases, the first feedback information may be associated with the identification P1 information that may identify a particular beam of the beam sweep transmissions, which may be an identification of an SS block that is transmitted by the base station. In some cases, the first feedback may indicate that particular SS block or wide beam transmission that is received by the UE 115-c with a highest gain, or that has an acceptable gain.

At block 525, the UE 115-c may determine second feedback information. In some cases, the second feedback information may be associated with the identification of P2 information that may identify beam refinement information for subsequent transmissions. In some cases, the second feedback information may indicate which of a number of tone beams is received at a highest gain at the UE 115-c. In some cases, the second feedback information may include other feedback information, such as SR information or neighbor cell information, for example.

At block 530, the UE 115-c may identify the partitioned dimensions. As discussed above, the partitioned dimensions may include one or more of a time dimension, a frequency dimension, a root sequence dimension, a cyclic shift dimension, a time-frequency dimension, or any combination thereof. In some cases, the UE 115-c may identify the partitioned dimensions based on configuration that is received from the base station 105-c. In some cases, the configuration information and the partitioned dimensions may be provided in a SIB, MIB, RMSI, or any combination thereof, and may be transmitted in a PBCH transmission in a SS block, for example.

At block 535, the UE 115-c may determine partitions for an uplink transmission. The uplink transmission may be, for example, a random access request, and the partitions may be determined based on the identified partitioned dimensions, the associated partitions of each partitioned dimension, and the determined first and second feedback. In some cases, a first partitioned dimension may be used to indicate a beam from the beam sweeping operation, and a second partitioned dimension may be used to indicate beam refinement feedback from one or more tone beams transmitted by the base station 105-c. The UE 115-c may transmit the uplink transmission 540 using the selected partitions.

At block 545, the base station 105-c may determine the first and second feedback information. The base station 105-c, in some examples, may identify resources and uplink partitions used for the uplink transmission, and may determine the feedback based on the associated uplink partitions. In some cases, the base station 105-c may receive the uplink transmission 540 (e.g., a RACH MSG1 transmission) and identify that it is received in a particular partition of a particular uplink resource. The particular uplink resource may be associated with an SS block of the beam sweeping operation, and the partition may be associated with a tone beam, and thus the base station 105-c may determine beam feedback (e.g., P1 feedback) and beam refinement feedback (e.g., P2 feedback) from the single uplink transmission 540.

Figure 6:
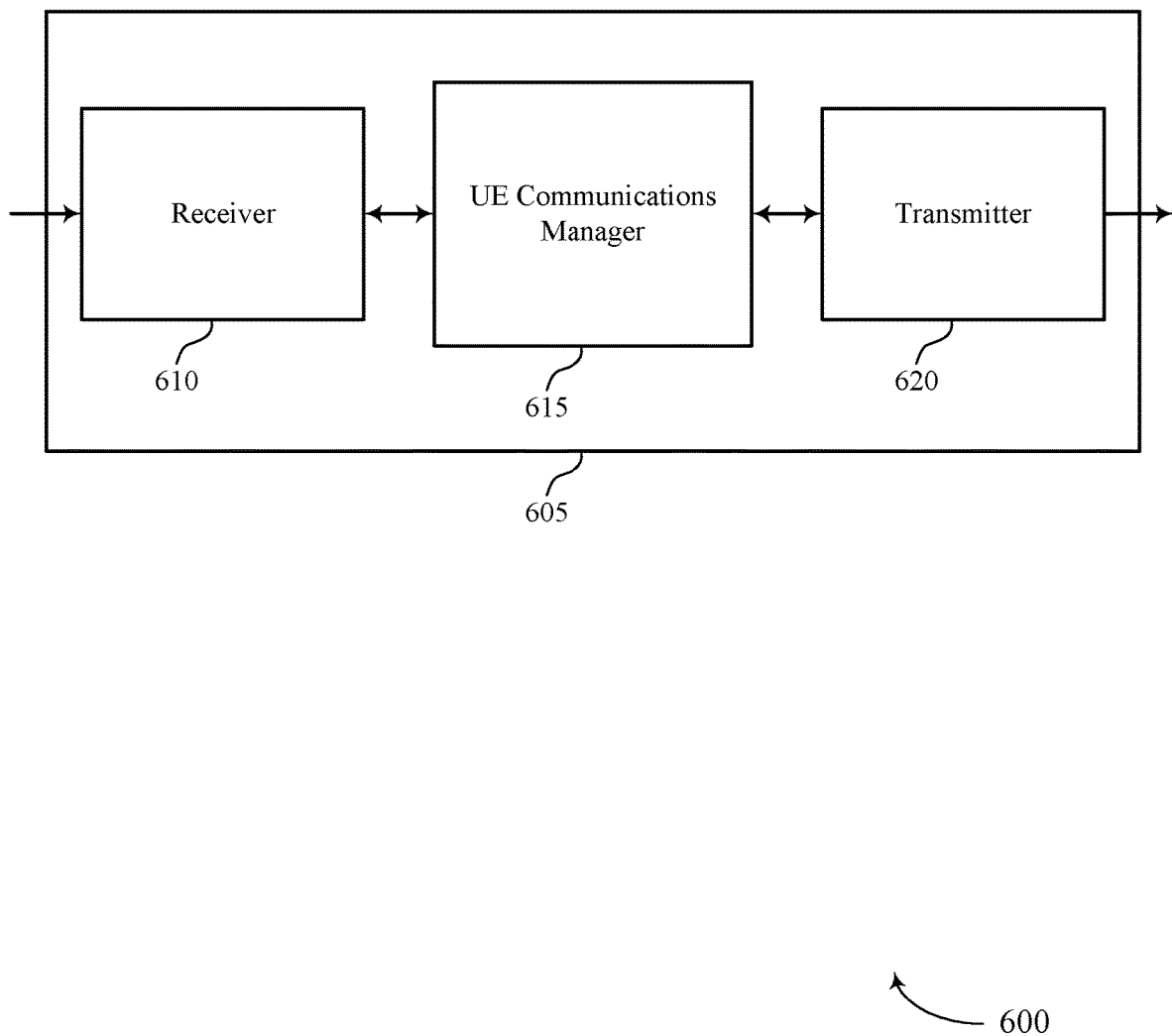
FIGS. 6 through 8 show block diagrams of a device that supports beam management techniques in millimeter wave systems in accordance with aspects of the present disclosure.

FIG. 6 shows a block diagram 600 of a wireless device 605 that supports beam management techniques in millimeter wave systems in accordance with aspects of the present disclosure. Wireless device 605 may be an example of aspects of a user equipment (UE) 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to beam management techniques in millimeter wave systems, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may measure two or more downlink transmission beams transmitted from a transmitter in a beam sweep procedure, determine first feedback information based on the measuring that indicates a first downlink transmission beam of the two or more downlink transmission beams, determine second feedback information that is to be transmitted to the transmitter, identify two or more partitioned dimensions for an uplink transmission including a first partitioned dimension for indicating the first feedback information and a second partitioned dimension for indicating the second feedback information, and transmit the uplink transmission to the transmitter using a first partition of the first partitioned dimension and a second partition of the second partitioned dimension that are selected based on the identifying.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
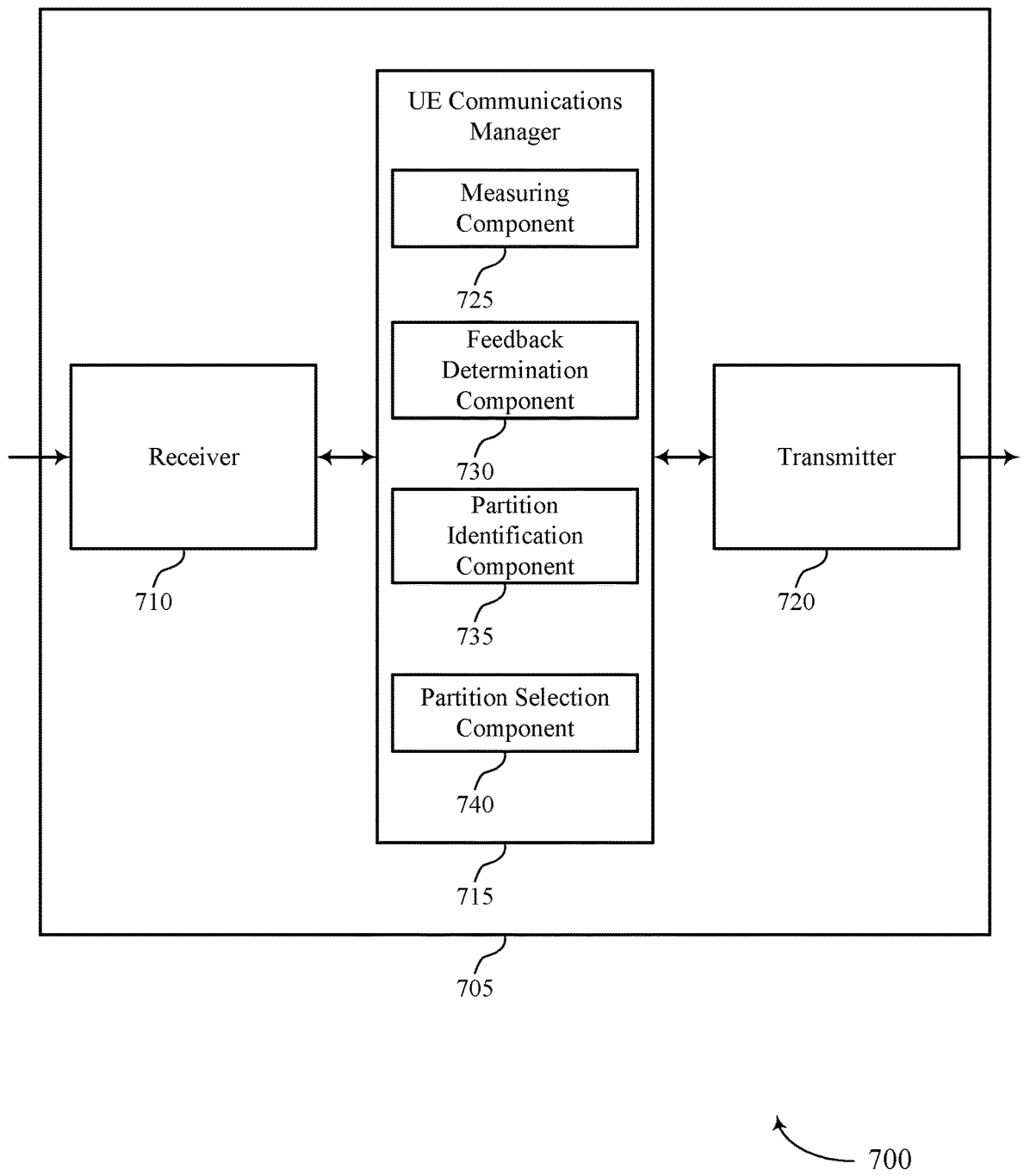

FIG. 7 shows a block diagram 700 of a wireless device 705 that supports beam management techniques in millimeter wave systems in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to beam management techniques in millimeter wave systems, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include measuring component 725, feedback determination component 730, partition identification component 735, and partition selection component 740.

Measuring component 725 may measure two or more downlink transmission beams transmitted from a transmitter in a beam sweep procedure. In some cases, the measuring the two or more downlink transmission beams includes receiving each of the two or more downlink transmission beams in an associated SS block transmission, and where the first downlink transmission beam is associated with a first SS block transmission.

Feedback determination component 730 may determine first feedback information based on the measuring that indicates a first downlink transmission beam of the two or more downlink transmission beams and determine second feedback information that is to be transmitted to the transmitter. In some cases, the second feedback information includes scheduling request information or beam refinement information.

Partition identification component 735 may identify two or more partitioned dimensions for an uplink transmission including a first partitioned dimension for indicating the first feedback information and a second partitioned dimension for indicating the second feedback information. In some cases, partition identification component 735 may receive configuration information (e.g., in MIB/SIB/RMSI) that indicates the two or more partitioned dimensions and a range of feedback values associated each partition of each partitioned dimension. In some cases, the different partitions in each partitioned dimension correspond to different feedback information. In some cases, the two or more partitioned dimensions include partitions in one or more of a time resource dimension including a set of available time resources for the uplink transmission, a frequency resource dimension including set of available frequency resources for the uplink transmission, a root sequence dimension including a set of root sequences available for the uplink transmission, a cyclic shift dimension including a set of cyclic shifts available for the uplink transmission, a time-frequency dimension that includes a set of time-frequency resources available for the uplink transmission, or any combination thereof. In some cases, the frequency resource dimension includes independent or overlapping frequency resources associated with two or more partitions within the set of available frequency resources.

Partition selection component 740 may select a partition based on the first and second feedback and transmit the uplink transmission to the transmitter using a first partition of the first partitioned dimension and a second partition of the second partitioned dimension that are selected based on the identification of the partitions.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
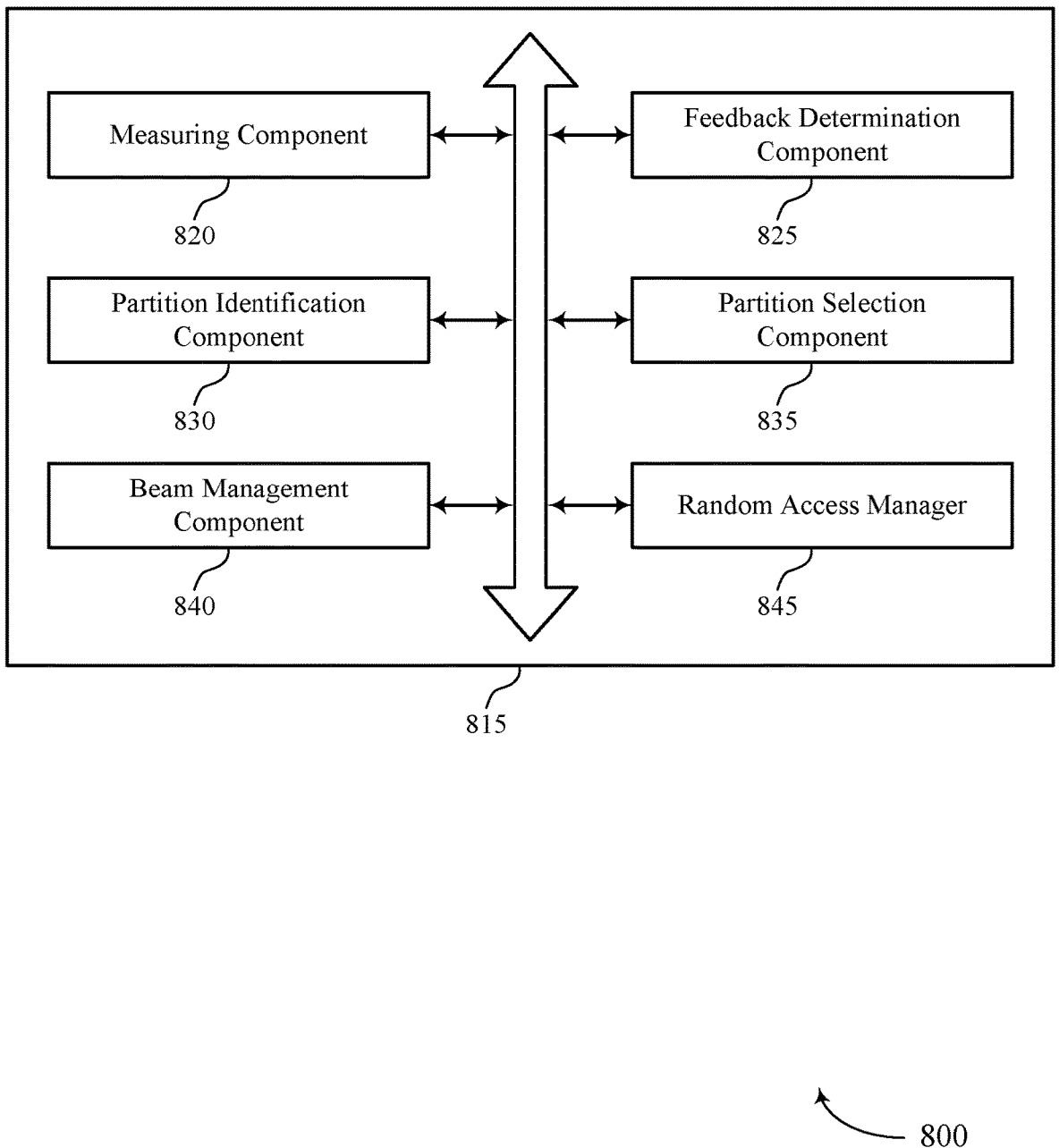

FIG. 8 shows a block diagram 800 of a UE communications manager 815 that supports beam management techniques in millimeter wave systems in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include measuring component 820, feedback determination component 825, partition identification component 830, partition selection component 835, beam management component 840, and random access manager 845. Each of these modules may communicate, directly or indirectly, with one another (e.g., via one or more buses).

Measuring component 820 may measure two or more downlink transmission beams transmitted from a transmitter in a beam sweep procedure. In some cases, the measuring the two or more downlink transmission beams further includes receiving each of the two or more downlink transmission beams in an associated SS block transmission, and where the first downlink transmission beam is associated with a first SS block transmission.

Feedback determination component 825 may determine first feedback information based on the measuring that indicates a first downlink transmission beam of the two or more downlink transmission beams and determine second feedback information that is to be transmitted to the transmitter. In some cases, the second feedback information includes scheduling request information or beam refinement information.

Partition identification component 830 may identify two or more partitioned dimensions for an uplink transmission including a first partitioned dimension for indicating the first feedback information and a second partitioned dimension for indicating the second feedback information. In some cases, partition identification component 830 may receive configuration information (e.g., in MIB/SIB/RMSI) that indicates the two or more partitioned dimensions and a range of feedback values associated each partition of each partitioned dimension. In some cases, the different partitions in each partitioned dimension correspond to different feedback information. In some cases, the two or more partitioned dimensions include partitions in one or more of a time resource dimension including a set of available time resources for the uplink transmission, a frequency resource dimension including set of available frequency resources for the uplink transmission, a root sequence dimension including a set of root sequences available for the uplink transmission, a cyclic shift dimension including a set of cyclic shifts available for the uplink transmission, a time-frequency dimension that includes a set of time-frequency resources available for the uplink transmission, or any combination thereof. In some cases, the frequency resource dimension includes independent or overlapping frequency resources associated with two or more partitions within the set of available frequency resources.

Partition selection component 835 may select a partition based on the first and second feedback and transmit the uplink transmission to the transmitter using a first partition of the first partitioned dimension and a second partition of the second partitioned dimension that are selected based on the identification of the partitions.

Beam management component 840 may identify and manage transmission beams at the UE. In some cases, the two or more downlink transmission beams include at least a first beamformed signal and a second beamformed signal, the first beamformed signal and the second beamformed signal may have different beamforming parameters. The second feedback information may indicate beam refinement information based on measurements of the first beamformed signal and the second beamformed signal. In some cases, the first beamformed signal and the second beamformed signal are transmitted in different tone beams each corresponding to a different beam direction of the SS block transmission from the transmitter, and the beam refinement information is based on a measured gain of each of the different tone beams.

Random access manager 845 may format a random access request for transmission in the uplink transmission. In some cases, the uplink transmission includes a random access channel (RACH) message having a sequence derived from at least one of a set of root sequences, a set of cyclic shifts, a set of time-frequency resources, or any combination thereof, the first partitioned dimension includes a set of RACH resources for transmitting the RACH message, and the first partition corresponds to a first RACH resource of the set of RACH resources associated with the first downlink transmission beam, and the second partitioned dimension includes two or more partitions in the set of root sequences, the set of cyclic shifts, the set of time-frequency resources, or any combination thereof.

Figure 9:
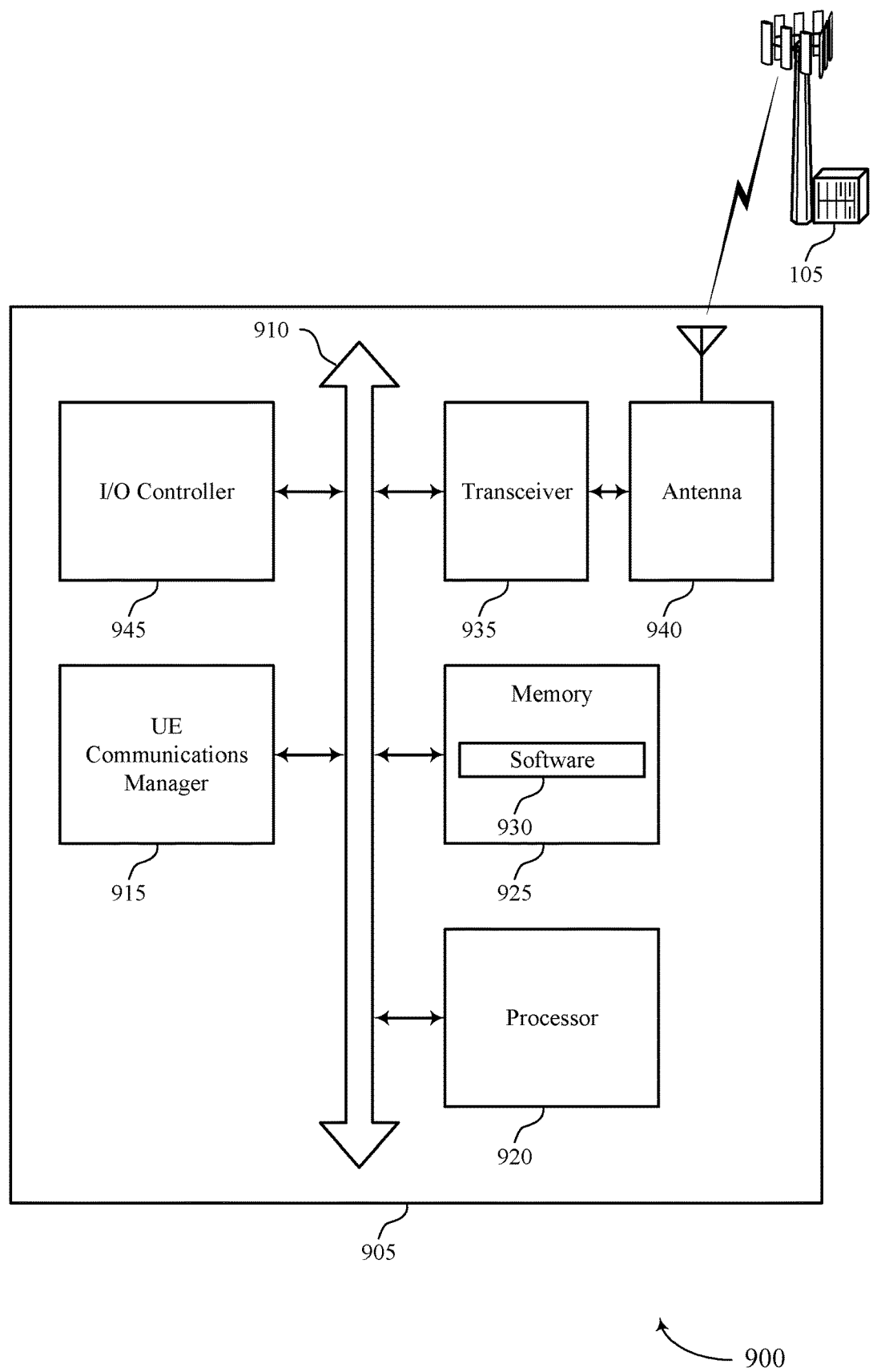
FIG. 9 illustrates a block diagram of a system including a UE that supports beam management techniques in millimeter wave systems in accordance with aspects of the present disclosure.

FIG. 9 shows a diagram of a system 900 including a device 905 that supports beam management techniques in millimeter wave systems in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting beam management techniques in millimeter wave systems).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support beam management techniques in millimeter wave systems. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-OS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
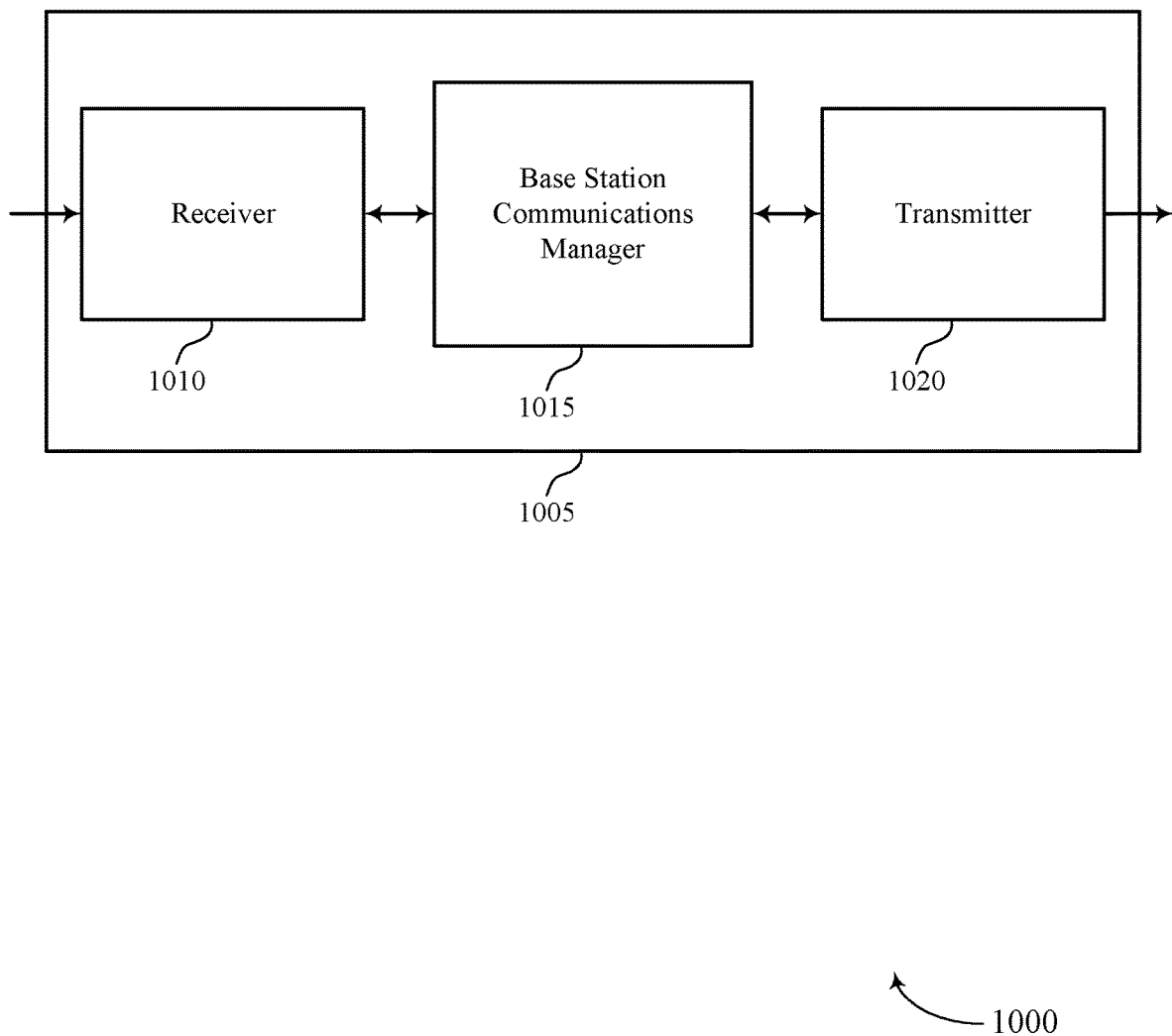
FIGS. 10 through 12 show block diagrams of a device that supports beam management techniques in millimeter wave systems in accordance with aspects of the present disclosure.

FIG. 10 shows a block diagram 1000 of a wireless device 1005 that supports beam management techniques in millimeter wave systems in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to beam management techniques in millimeter wave systems, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit two or more downlink transmission beams to a receiver in a beam sweep procedure, identify two or more partitioned dimensions for an uplink transmission, including a first partitioned dimension for indicating, by the receiver, first feedback information and a second partitioned dimension for indicating second feedback information, and where the first feedback information identifying a first downlink transmission beam of the two or more downlink transmission beams and the second feedback information identifying beam refinement information based on measurements of one or more of the downlink transmission beams, receive the uplink transmission from the receiver that uses a first partition of the first partitioned dimension and a second partition of the second partitioned dimension, and determine the first feedback information and the second feedback information based on the uplink transmission.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
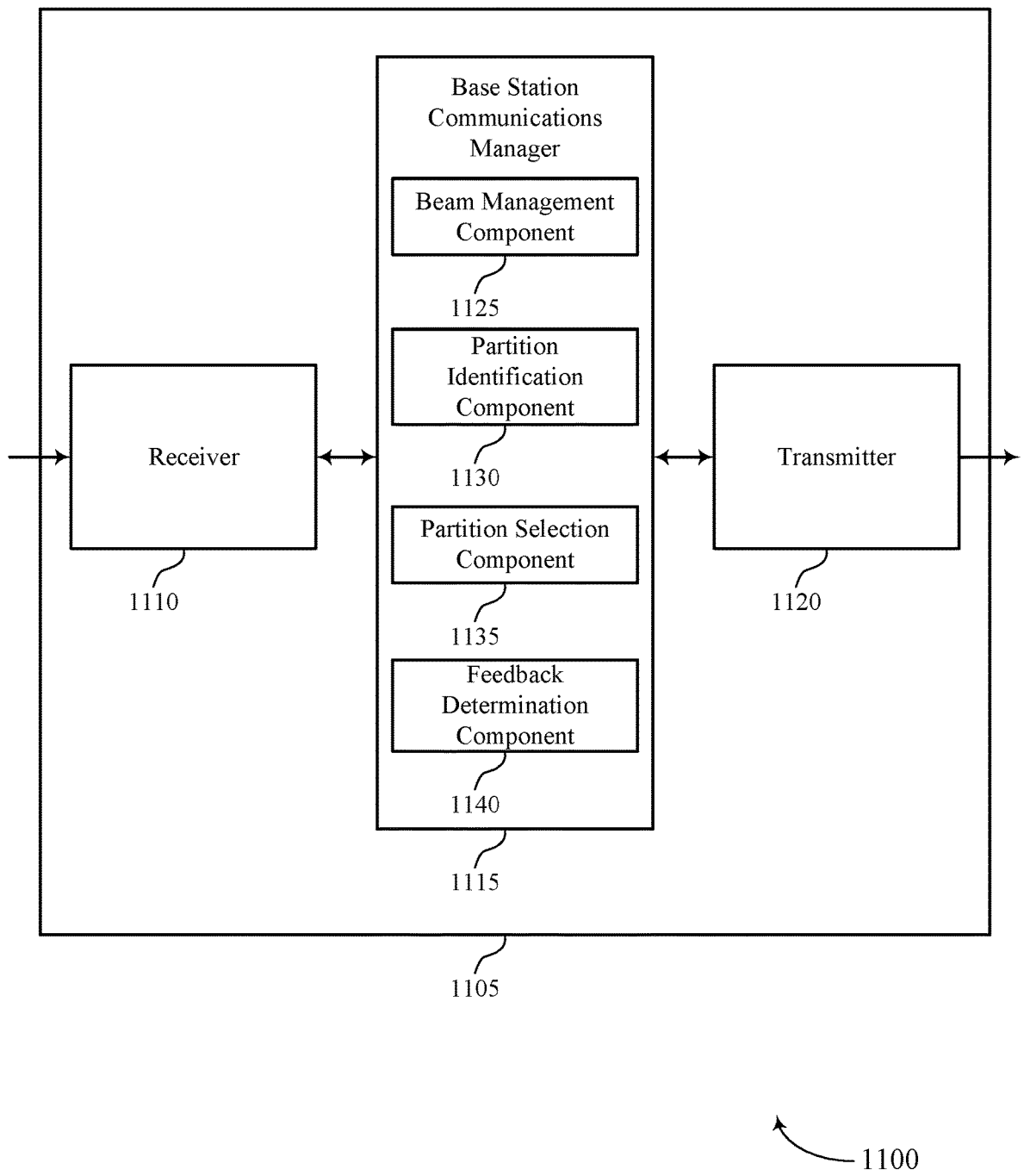

FIG. 11 shows a block diagram 1100 of a wireless device 1105 that supports beam management techniques in millimeter wave systems in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to beam management techniques in millimeter wave systems, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include beam management component 1125, partition identification component 1130, partition selection component 1135, and feedback determination component 1140.

Beam management component 1125 may transmit two or more downlink transmission beams to a receiver in a beam sweep procedure. In some cases, the transmitting the two or more downlink transmission beams further includes transmitting each of the two or more downlink transmission beams in an associated synchronization signal (SS) block transmission, and where the first partitioned dimension includes a set of uplink time resources for transmitting the uplink transmission, each uplink time resource corresponding to a different partition of the first partitioned dimension, and each uplink time resource is associated with an SS block transmission.

Partition identification component 1130 may identify two or more partitioned dimensions for an uplink transmission, including a first partitioned dimension for indicating, by the receiver, first feedback information and a second partitioned dimension for indicating second feedback information. In some cases, the first feedback information may identify a first downlink transmission beam of the two or more downlink transmission beams and the second feedback information may identify beam refinement information based on measurements of one or more of the downlink transmission beams. In some cases, partition identification component 1130 may transmit configuration information that indicates the two or more partitioned dimensions and a range of feedback values associated each partition of each partitioned dimension. In some cases, the two or more partitioned dimensions include partitions in one or more of a time resource dimension that includes a set of available time resources for the uplink transmission, a frequency resource dimension including set of available frequency resources for the uplink transmission, a root sequence dimension including a set of root sequences available for the uplink transmission, a cyclic shift dimension including a set of cyclic shifts available for the uplink transmission, a time-frequency dimension that includes a set of time-frequency resources available for the uplink transmission, or any combination thereof. In some cases, the frequency resource dimension includes independent or overlapping frequency resources associated with two or more partitions within the set of available frequency resources. In some cases, the configuration information is transmitted in a SIB.

Partition selection component 1135 may receive the uplink transmission from the receiver that and identify a selected first partition of the first partitioned dimension and a second partition of the second partitioned dimension.

Feedback determination component 1140 may determine the first feedback information and the second feedback information based on the uplink transmission. In some cases, the two or more downlink transmission beams include at least a first beamformed signal and a second beamformed signal, the first beamformed signal and the second beamformed signal having different beamforming parameters, and the second feedback information indicates beam refinement information based on measurements of the first beamformed signal and the second beamformed signal at the receiver. In some cases, the first beamformed signal and the second beamformed signal are transmitted in different tone beams that each correspond to a different beam direction of the SS block transmission, and the beam refinement information is based on a measured gain of each of the different tone beams at the receiver.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
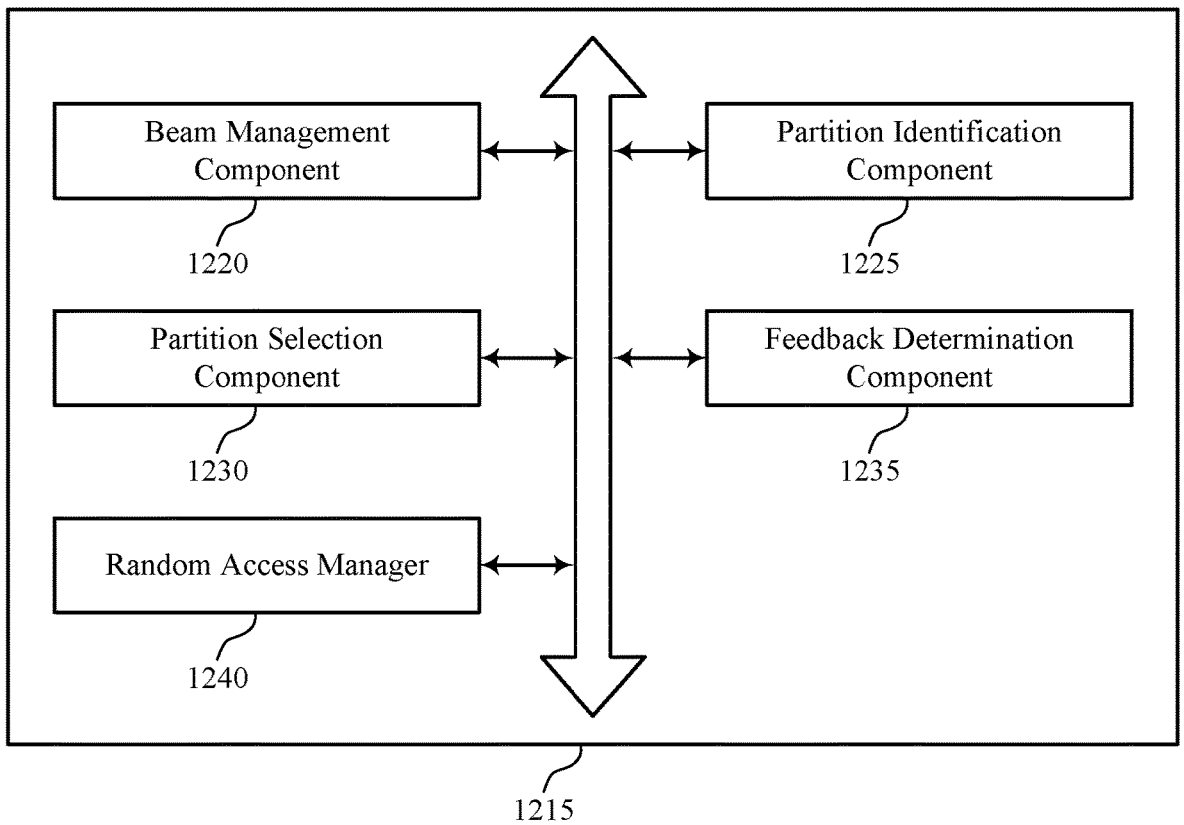

FIG. 12 shows a block diagram 1200 of a base station communications manager 1215 that supports beam management techniques in millimeter wave systems in accordance with aspects of the present disclosure. The base station communications manager 1215 may be an example of aspects of a base station communications manager 1315 described with reference to FIGS. 10, 11, and 13. The base station communications manager 1215 may include beam management component 1220, partition identification component 1225, partition selection component 1230, feedback determination component 1235, and random access manager 1240. Each of these modules may communicate, directly or indirectly, with one another (e.g., via one or more buses).

Beam management component 1220 may transmit two or more downlink transmission beams to a receiver in a beam sweep procedure. In some cases, the transmitting the two or more downlink transmission beams further includes transmitting each of the two or more downlink transmission beams in an associated synchronization signal (SS) block transmission, and where the first partitioned dimension includes a set of uplink time resources for transmitting the uplink transmission, each uplink time resource corresponding to a different partition of the first partitioned dimension, and each uplink time resource is associated with an SS block transmission.

Partition identification component 1225 may identify two or more partitioned dimensions for an uplink transmission, including a first partitioned dimension for indicating, by the receiver, first feedback information and a second partitioned dimension for indicating second feedback information. In some cases, the first feedback information may identify a first downlink transmission beam of the two or more downlink transmission beams and the second feedback information may identify beam refinement information based on measurements of one or more of the downlink transmission beams. In some cases, partition identification component 1225 may transmit configuration information that indicates the two or more partitioned dimensions and a range of feedback values associated each partition of each partitioned dimension. In some cases, the two or more partitioned dimensions include partitions in one or more of a time resource dimension that includes a set of available time resources for the uplink transmission, a frequency resource dimension including set of available frequency resources for the uplink transmission, a root sequence dimension including a set of root sequences available for the uplink transmission, a cyclic shift dimension including a set of cyclic shifts available for the uplink transmission, a time-frequency dimension that includes a set of time-frequency resources available for the uplink transmission, or any combination thereof. In some cases, the frequency resource dimension includes independent or overlapping frequency resources associated with two or more partitions within the set of available frequency resources. In some cases, the configuration information is transmitted in a SIB.

Partition selection component 1230 may receive the uplink transmission from the receiver that and identify a selected first partition of the first partitioned dimension and a second partition of the second partitioned dimension.

Feedback determination component 1235 may determine the first feedback information and the second feedback information based on the uplink transmission. In some cases, the two or more downlink transmission beams include at least a first beamformed signal and a second beamformed signal, the first beamformed signal and the second beamformed signal having different beamforming parameters, and the second feedback information indicates beam refinement information based on measurements of the first beamformed signal and the second beamformed signal at the receiver. In some cases, the first beamformed signal and the second beamformed signal are transmitted in different tone beams that each correspond to a different beam direction of the SS block transmission, and the beam refinement information is based on a measured gain of each of the different tone beams at the receiver.

Random access manager 1240 may identify random access messages from the UE in the uplink transmission. In some cases, the uplink transmission includes a RACH message having a sequence derived from at least one of a set of root sequences, a set of cyclic shifts, a set of time-frequency resources, or any combination thereof, and the first partitioned dimension includes a set of RACH resources for transmitting the RACH message, and the first partition corresponds to a first RACH resource of the set of RACH resources associated with a first downlink transmission beam, and the second partitioned dimension includes two or more partitions in the set of root sequences, the set of cyclic shifts, the set of time-frequency resources, or any combination thereof.

Figure 13:
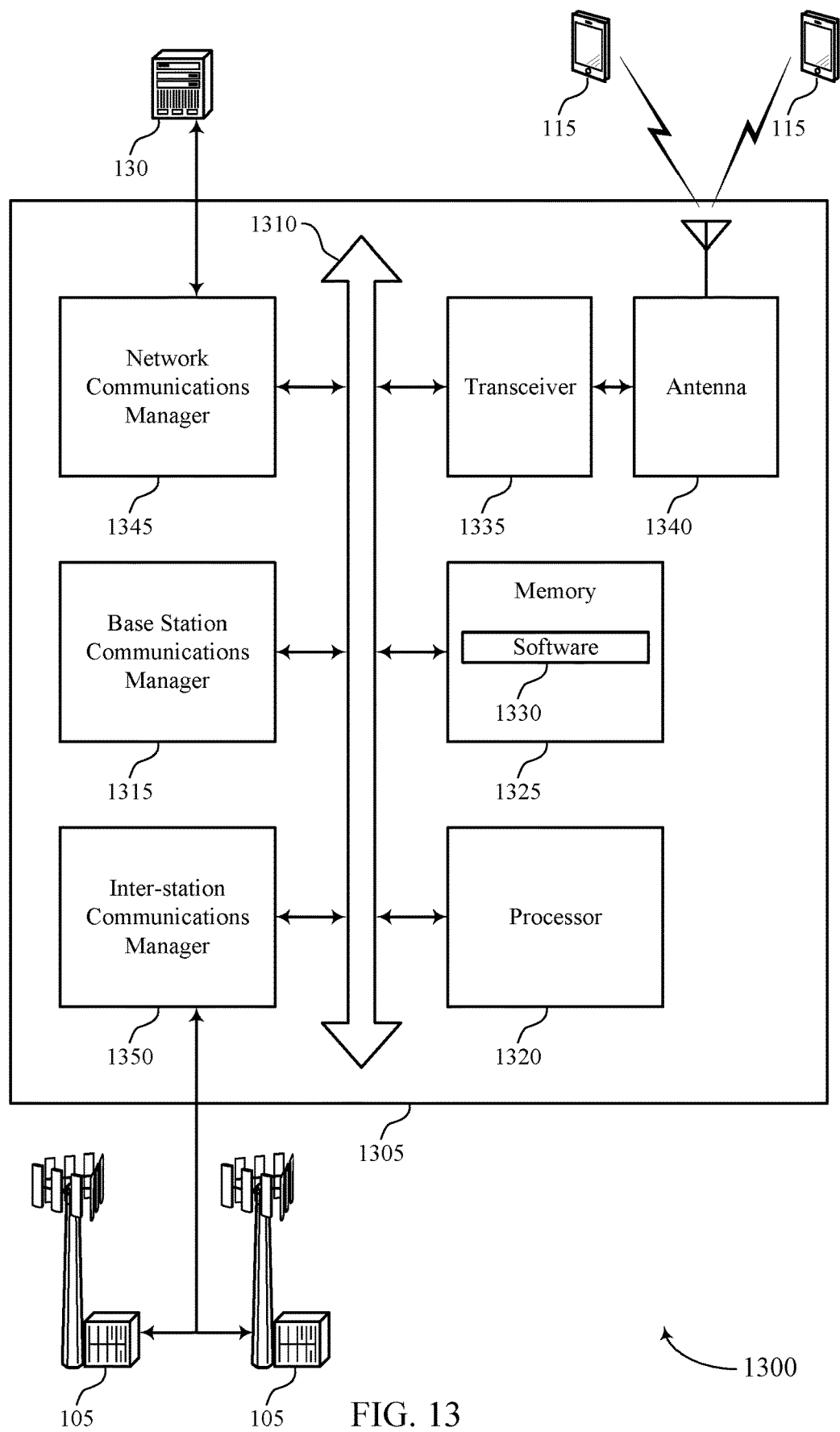
FIG. 13 illustrates a block diagram of a system including a base station that supports beam management techniques in millimeter wave systems in accordance with aspects of the present disclosure.

FIG. 13 shows a diagram of a system 1300 including a device 1305 that supports beam management techniques in millimeter wave systems in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting beam management techniques in millimeter wave systems).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support beam management techniques in millimeter wave systems. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
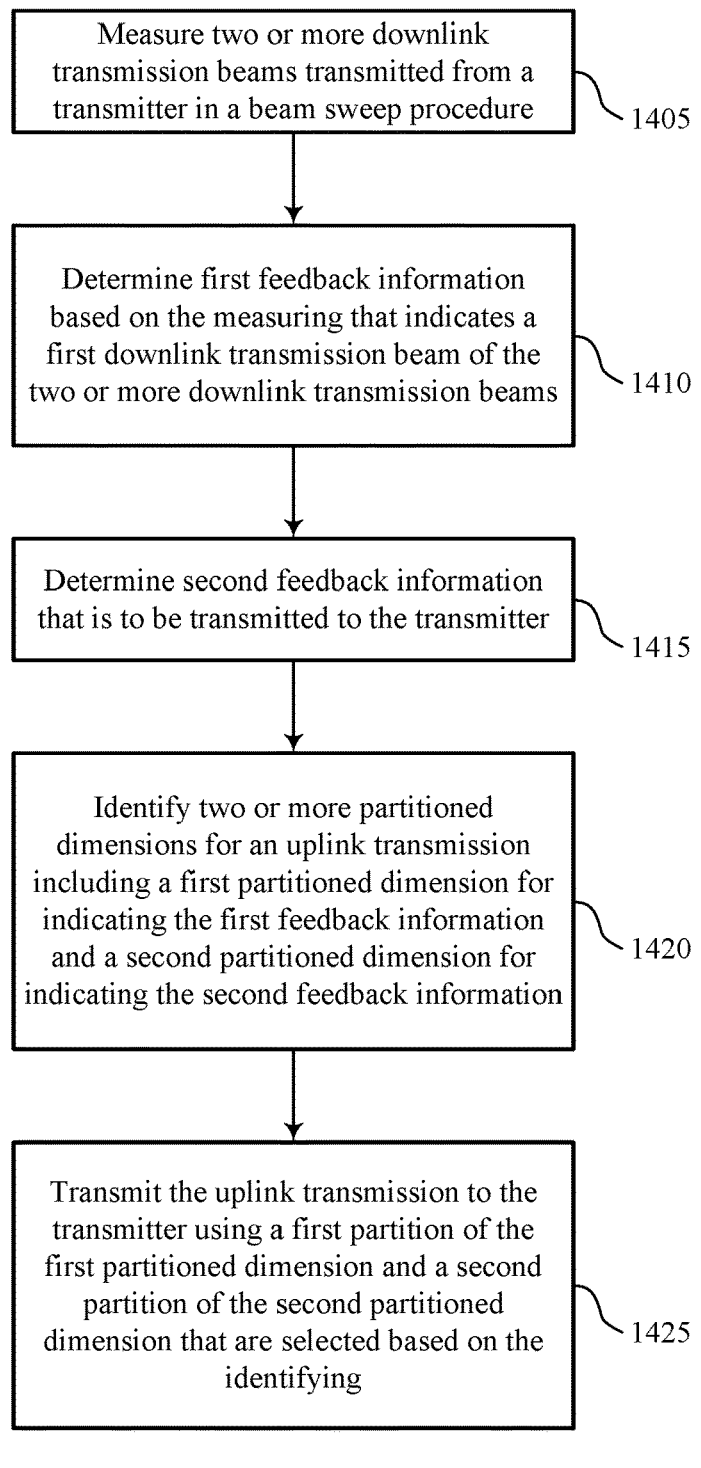
FIGS. 14 through 17 illustrate methods for beam management techniques in millimeter wave systems in accordance with aspects of the present disclosure.

FIG. 14 shows a flowchart illustrating a method 1400 for beam management techniques in millimeter wave systems in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may measure two or more downlink transmission beams transmitted from a transmitter in a beam sweep procedure. The operations of block 1405 may be performed according to the methods described herein. In certain examples, aspects of the operations of block 1405 may be performed by a measuring component as described with reference to FIGS. 6 through 9. In some examples, the UE may measure a gain of received downlink transmission beams. In some cases, the UE may measure gains of two or more wide beam transmissions that are associated with two or more SS block transmissions.

At block 1410 the UE 115 may determine first feedback information based at least in part on the measuring that indicates a first downlink transmission beam of the two or more downlink transmission beams. The operations of block 1410 may be performed according to the methods described herein. In certain examples, aspects of the operations of block 1410 may be performed by a feedback determination component as described with reference to FIGS. 6 through 9. In some cases, the first feedback information may be associated with the identification P1 information that may identify a particular beam of two or more beam sweep transmissions, which may be an identification of an SS block that is transmitted by the transmitter. In some cases, the first feedback may indicate that particular SS block or wide beam transmission that is received by the UE with a highest gain, or that has an acceptable gain.

At block 1415 the UE 115 may determine second feedback information that is to be transmitted to the transmitter. The operations of block 1415 may be performed according to the methods described herein. In certain examples, aspects of the operations of block 1415 may be performed by a feedback determination component as described with reference to FIGS. 6 through 9. In some cases, the second feedback information may be associated with the identification of P2 information or beam refinement information. In some cases, the second feedback information may indicate which of a number of tone beams is received at a highest gain at the UE. In some cases, the second feedback information may include other feedback information, such as SR information or neighbor cell information, for example.

At block 1420 the UE 115 may identify two or more partitioned dimensions for an uplink transmission including a first partitioned dimension for indicating the first feedback information and a second partitioned dimension for indicating the second feedback information. The operations of block 1420 may be performed according to the methods described herein. In certain examples, aspects of the operations of block 1420 may be performed by a partition identification component as described with reference to FIGS. 6 through 9. In some cases, the partitioned dimensions may include one or more of a time dimension, a frequency dimension, a root sequence dimension, a cyclic shift dimension, a time-frequency dimension, or any combination thereof. In some cases, the UE may identify the partitioned dimensions based on configuration that is received from the transmitter, such as in a SIB, MIB, RMSI, or any combination thereof.

At block 1425 the UE 115 may transmit the uplink transmission to the transmitter using a first partition of the first partitioned dimension and a second partition of the second partitioned dimension that are selected based at least in part on the identifying. The operations of block 1425 may be performed according to the methods described herein. In certain examples, aspects of the operations of block 1425 may be performed by a partition selection component as described with reference to FIGS. 6 through 9. The uplink transmission may be, for example, a random access request, and the partitions may be determined based on the identified partitioned dimensions, the associated partitions of each partitioned dimension, and the determined first and second feedback. In some cases, a first partitioned dimension may be used to indicate a beam from the beam sweeping operation, and a second partitioned dimension may be used to indicate beam refinement feedback from one or more tone beams transmitted by the transmitter.

Figure 15:
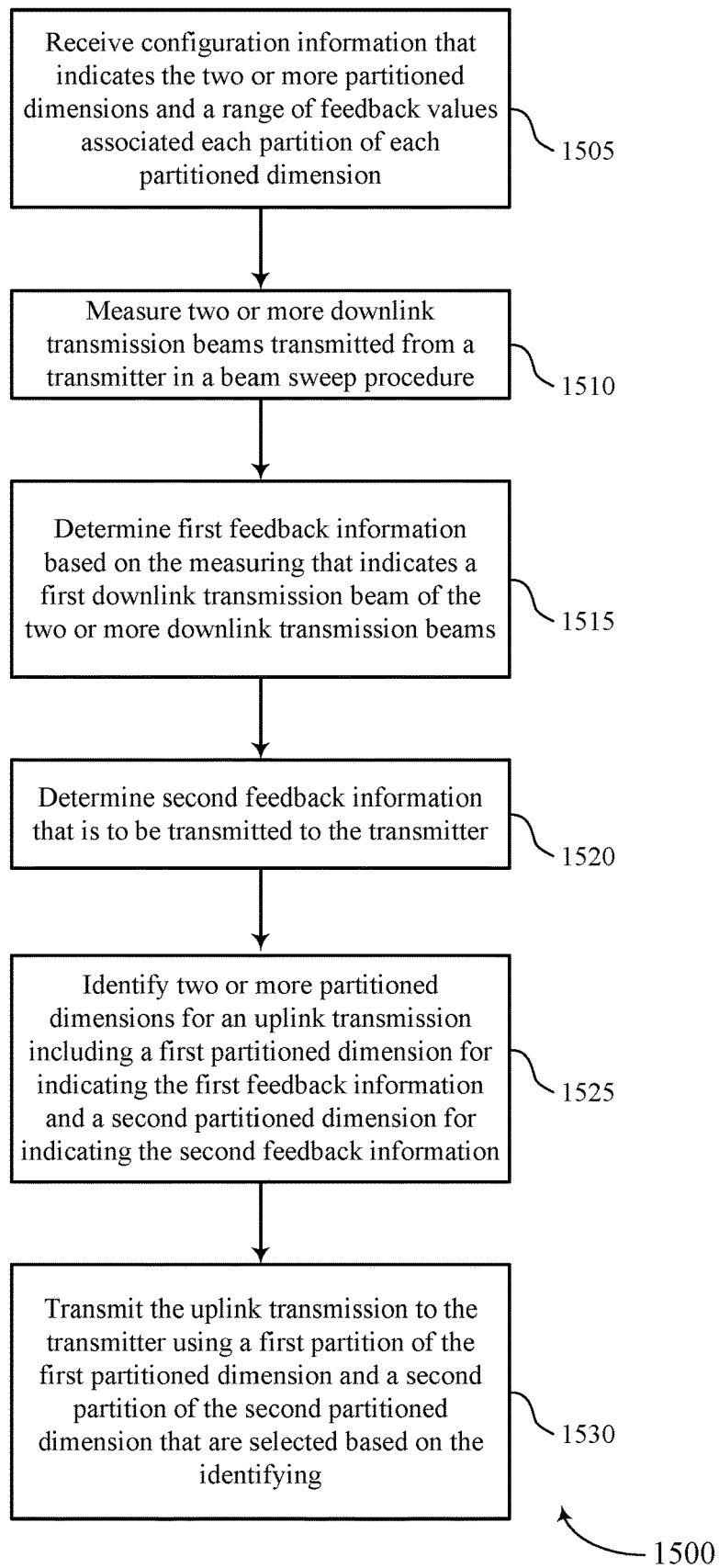

FIG. 15 shows a flowchart illustrating a method 1500 for beam management techniques in millimeter wave systems in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive configuration information that indicates the two or more partitioned dimensions and a range of feedback values associated each partition of each partitioned dimension. The operations of block 1505 may be performed according to the methods described herein. In certain examples, aspects of the operations of block 1505 may be performed by a partition identification component as described with reference to FIGS. 6 through 9. In some cases, the configuration information may be provided by a SIB, MIB, RMSI, in a PBCH of a SS block, or any combination thereof. In some cases the configuration information provides a mapping between different feedback information and different resource partitions (e.g., different frequency partitions of an uplink resource may be associated with different tone beams transmitted in a SS block transmission).

At block 1510 the UE 115 may measure two or more downlink transmission beams transmitted from a transmitter in a beam sweep procedure. The operations of block 1510 may be performed according to the methods described herein. In certain examples, aspects of the operations of block 1510 may be performed by a measuring component as described with reference to FIGS. 6 through 9. In some examples, the UE may measure a gain of received downlink transmission beams. In some cases, the UE may measure gains of two or more wide beam transmissions that are associated with two or more SS block transmissions.

At block 1515 the UE 115 may determine first feedback information based at least in part on the measuring that indicates a first downlink transmission beam of the two or more downlink transmission beams. The operations of block 1515 may be performed according to the methods described herein. In certain examples, aspects of the operations of block 1515 may be performed by a feedback determination component as described with reference to FIGS. 6 through 9. In some cases, the first feedback information may be associated with the identification P1 information that may identify a particular beam of two or more beam sweep transmissions, which may be an identification of an SS block that is transmitted by the transmitter. In some cases, the first feedback may indicate that particular SS block or wide beam transmission that is received by the UE with a highest gain, or that has an acceptable gain.

At block 1520 the UE 115 may determine second feedback information that is to be transmitted to the transmitter. The operations of block 1520 may be performed according to the methods described herein. In certain examples, aspects of the operations of block 1520 may be performed by a feedback determination component as described with reference to FIGS. 6 through 9. In some cases, the second feedback information may be associated with the identification of P2 information or beam refinement information. In some cases, the second feedback information may indicate which of a number of tone beams is received at a highest gain at the UE. In some cases, the second feedback information may include other feedback information, such as SR information or neighbor cell information, for example.

At block 1525 the UE 115 may identify two or more partitioned dimensions for an uplink transmission including a first partitioned dimension for indicating the first feedback information and a second partitioned dimension for indicating the second feedback information. The operations of block 1525 may be performed according to the methods described herein. In certain examples, aspects of the operations of block 1525 may be performed by a partition identification component as described with reference to FIGS. 6 through 9. In some cases, the partitioned dimensions may include one or more of a time dimension, a frequency dimension, a root sequence dimension, a cyclic shift dimension, a time-frequency dimension, or any combination thereof. In some cases, the UE may identify the partitioned dimensions based on configuration that is received from the transmitter, such as in a SIB, MIB, RMSI, or any combination thereof.

At block 1530 the UE 115 may transmit the uplink transmission to the transmitter using a first partition of the first partitioned dimension and a second partition of the second partitioned dimension that are selected based at least in part on the identifying. The operations of block 1530 may be performed according to the methods described herein. In certain examples, aspects of the operations of block 1530 may be performed by a partition selection component as described with reference to FIGS. 6 through 9. The uplink transmission may be, for example, a random access request, and the partitions may be determined based on the identified partitioned dimensions, the associated partitions of each partitioned dimension, and the determined first and second feedback. In some cases, a first partitioned dimension may be used to indicate a beam from the beam sweeping operation, and a second partitioned dimension may be used to indicate beam refinement feedback from one or more tone beams transmitted by the transmitter.

Figure 16:
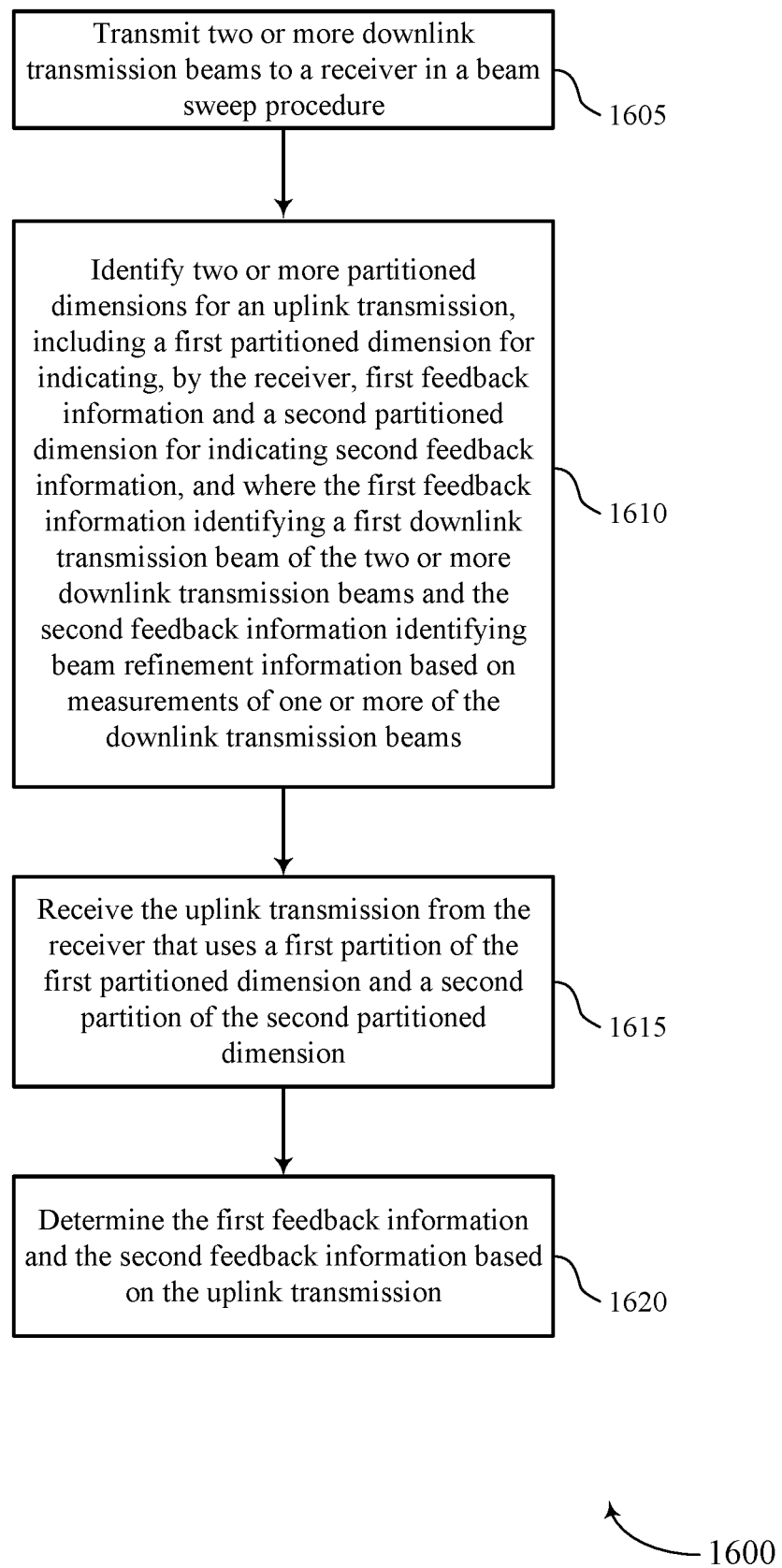

FIG. 16 shows a flowchart illustrating a method 1600 for beam management techniques in millimeter wave systems in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may transmit two or more downlink transmission beams to a receiver in a beam sweep procedure. The operations of block 1605 may be performed according to the methods described herein. In certain examples, aspects of the operations of block 1605 may be performed by a beam management component as described with reference to FIGS. 10 through 13. In some examples, the base station may transmit two or more wide beam transmission beams in different directions as part of the beam sweep procedure. In some cases, each of the wide beam transmissions may include as associated SS block transmission.

At block 1610 the base station 105 may identify two or more partitioned dimensions for an uplink transmission, including a first partitioned dimension for indicating, by the receiver, first feedback information and a second partitioned dimension for indicating second feedback information, and wherein the first feedback information identifying a first downlink transmission beam of the two or more downlink transmission beams and the second feedback information identifying beam refinement information based at least in part on measurements of one or more of the downlink transmission beams. The operations of block 1610 may be performed according to the methods described herein. In certain examples, aspects of the operations of block 1610 may be performed by a partition identification component as described with reference to FIGS. 10 through 13. In some cases, the partitioned dimensions may include one or more of a time dimension, a frequency dimension, a root sequence dimension, a cyclic shift dimension, a time-frequency dimension, or any combination thereof. In some cases, the base station may provide configuration information (e.g., via MIB, SIB, RMSI, or combinations thereof) that may identify the partitioned dimensions.

At block 1615 the base station 105 may receive the uplink transmission from the receiver that uses a first partition of the first partitioned dimension and a second partition of the second partitioned dimension. The operations of block 1615 may be performed according to the methods described herein. In certain examples, aspects of the operations of block 1615 may be performed by a partition selection component as described with reference to FIGS. 10 through 13. In some cases, the first partitioned dimension may include time resources that are associated with particular SS blocks that are transmitted in each of the two or more downlink transmission beams in the beam sweep procedure, and the second partitioned dimension may include one or more of a further time dimension partition, a frequency dimension, a root sequence dimension, a cyclic shift dimension, a time-frequency dimension, or any combination thereof.

At block 1620 the base station 105 may determine the first feedback information and the second feedback information based at least in part on the uplink transmission. The operations of block 1620 may be performed according to the methods described herein. In certain examples, aspects of the operations of block 1620 may be performed by a feedback determination component as described with reference to FIGS. 10 through 13. The uplink transmission may be, for example, a random access request, and the first and second feedback information may be determined based on which partitioned dimensions are used to transmit the uplink transmission. In some cases, a first partitioned dimension may be used to indicate a beam from the beam sweeping operation as the first feedback information, and a second partitioned dimension may be used to indicate beam refinement feedback from one or more tone beams as the second feedback information.

Figure 17:
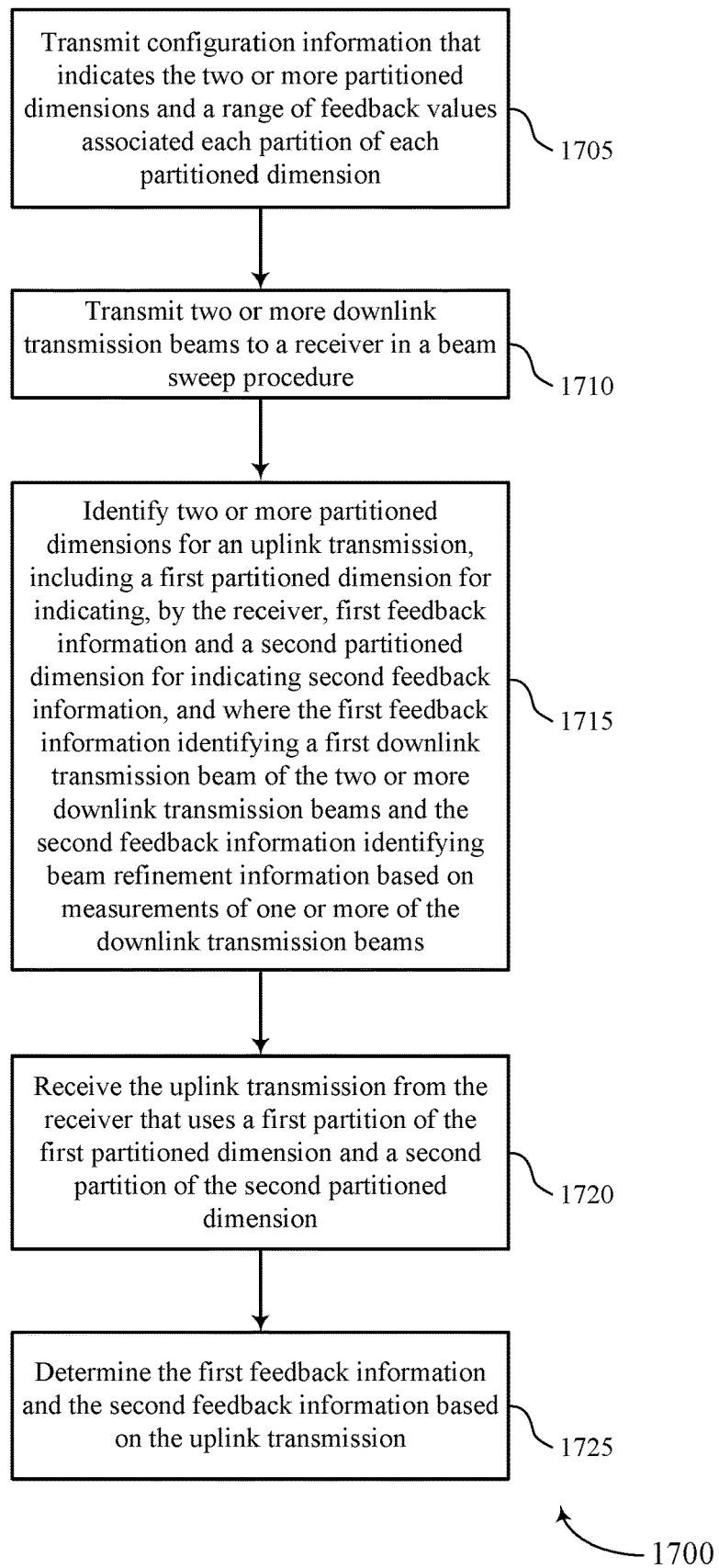

FIG. 17 shows a flowchart illustrating a method 1700 for beam management techniques in millimeter wave systems in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may transmit configuration information that indicates the two or more partitioned dimensions and a range of feedback values associated each partition of each partitioned dimension. The operations of block 1705 may be performed according to the methods described herein. In certain examples, aspects of the operations of block 1705 may be performed by a partition identification component as described with reference to FIGS. 10 through 13. In some cases, the configuration information may be provided by a SIB, MIB, RMSI, in a PBCH of a SS block, or any combination thereof. In some cases the configuration information provides a mapping between different feedback information and different resource partitions (e.g., different frequency partitions of an uplink resource may be associated with different tone beams transmitted in a SS block transmission).

At block 1710 the base station 105 may transmit two or more downlink transmission beams to a receiver in a beam sweep procedure. The operations of block 1710 may be performed according to the methods described herein. In certain examples, aspects of the operations of block 1710 may be performed by a beam management component as described with reference to FIGS. 10 through 13. In some examples, the base station may transmit two or more wide beam transmission beams in different directions as part of the beam sweep procedure. In some cases, each of the wide beam transmissions may include as associated SS block transmission.

At block 1715 the base station 105 may identify two or more partitioned dimensions for an uplink transmission, including a first partitioned dimension for indicating, by the receiver, first feedback information and a second partitioned dimension for indicating second feedback information, and wherein the first feedback information identifying a first downlink transmission beam of the two or more downlink transmission beams and the second feedback information identifying beam refinement information based at least in part on measurements of one or more of the downlink transmission beams. The operations of block 1715 may be performed according to the methods described herein. In certain examples, aspects of the operations of block 1715 may be performed by a partition identification component as described with reference to FIGS. 10 through 13. In some cases, the partitioned dimensions may include one or more of a time dimension, a frequency dimension, a root sequence dimension, a cyclic shift dimension, a time-frequency dimension, or any combination thereof.

At block 1720 the base station 105 may receive the uplink transmission from the receiver that uses a first partition of the first partitioned dimension and a second partition of the second partitioned dimension. The operations of block 1720 may be performed according to the methods described herein. In certain examples, aspects of the operations of block 1720 may be performed by a partition selection component as described with reference to FIGS. 10 through 13. In some cases, the first partitioned dimension may include time resources that are associated with particular SS blocks that are transmitted in each of the two or more downlink transmission beams in the beam sweep procedure, and the second partitioned dimension may include one or more of a further time dimension partition, a frequency dimension, a root sequence dimension, a cyclic shift dimension, a time-frequency dimension, or any combination thereof.

At block 1725 the base station 105 may determine the first feedback information and the second feedback information based at least in part on the uplink transmission. The operations of block 1725 may be performed according to the methods described herein. In certain examples, aspects of the operations of block 1725 may be performed by a feedback determination component as described with reference to FIGS. 10 through 13. The uplink transmission may be, for example, a random access request, and the first and second feedback information may be determined based on which partitioned dimensions are used to transmit the uplink transmission. In some cases, a first partitioned dimension may be used to indicate a beam from the beam sweeping operation as the first feedback information, and a second partitioned dimension may be used to indicate beam refinement feedback from one or more tone beams as the second feedback information.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    measuring two or more downlink transmission beams from a transmitter in a beam sweep via receiving the two or more downlink transmission beams in an associated synchronization signal (SS) block transmission, and wherein a first downlink transmission beam is associated with a first SS block transmission;
    determining first feedback information and second feedback information based at least in part on the measuring, wherein the first feedback information indicates beam selection information and the second feedback information indicates beam refinement information; and
    transmitting an uplink communication that indicates the first feedback information and the second feedback information, wherein the uplink communication uses a first partition of a first partitioned dimension to indicate the first feedback information, and uses a second partition of a second partitioned dimension to indicate the second feedback information,
    wherein the two or more downlink transmission beams include at least a first beamformed signal and a second beamformed signal, the first beamformed signal and the second beamformed signal having different beamforming parameters,
    the first feedback information indicates a first downlink transmission beam of the two or more downlink transmission beams based at least in part on measurements of the two or more downlink transmission beams, and
    the second feedback information indicates the beam refinement information based at least in part on measurements of the first beamformed signal and the second beamformed signal within the first downlink transmission beam.

2. The method of claim 1, wherein different partitions in each partitioned dimension correspond to different feedback information.

3. The method of claim 1, wherein:
    the first beamformed signal and the second beamformed signal within the first downlink transmission beam are transmitted in different tone beams each corresponding to a different beam direction of the first SS block transmission, and
    the beam refinement information is based at least in part on a measured gain of each of the different tone beams.

4. The method of claim 1, wherein the second feedback information includes scheduling request information.

5. The method of claim 1, wherein the first partitioned dimension and the second partitioned dimension include partitions in one or more of:
    a time resource dimension including a set of available time resources for the uplink communication,
    a frequency resource dimension including set of available frequency resources for the uplink communication,
    a root sequence dimension including a set of root sequences available for the uplink communication,
    a cyclic shift dimension including a set of cyclic shifts available for the uplink communication,
    a time-frequency dimension that includes a set of time-frequency resources available for the uplink communication, or
    any combination thereof.

6. The method of claim 5, wherein the frequency resource dimension includes independent or overlapping frequency resources associated with two or more partitions within the set of available frequency resources.

7. The method of claim 1, wherein:
    the uplink communication comprises a random access channel (RACH) message having a sequence derived from at least one of a set of root sequences, a set of cyclic shifts, a set of time-frequency resources, or any combination thereof,
    the first partitioned dimension includes a set of RACH resources for transmitting the RACH message, and the first partition corresponds to a first RACH resource of the set of RACH resources associated with a first downlink transmission beam, and
    the second partitioned dimension includes two or more partitions in the set of root sequences, the set of cyclic shifts, the set of time-frequency resources, or any combination thereof.

8. The method of claim 1, further comprising: receiving configuration information that indicates two or more partitioned dimensions and a range of feedback values associated each partition of each partitioned dimension.

9. The method of claim 8, wherein the configuration information is received in a system information block (SIB).

10. A method for wireless communication, comprising:
    transmitting two or more downlink transmission beams to a receiver in a beam sweep procedure in an associated synchronization signal (SS) block transmission, and wherein the first partitioned dimension includes a set of uplink time resources for transmitting the uplink transmission, each uplink time resource corresponding to a different partition of the first partitioned dimension, and each uplink time resource is associated with an SS block transmission;

receiving an uplink transmission from the receiver that includes first feedback information that indicates a first downlink transmission beam of the two or more downlink transmission beams and second feedback information that indicates beam refinement information associated with the first downlink transmission beam, wherein two or more partitions of a first partitioned dimension of the uplink transmission provide the first feedback information and two or more partitions of a second partitioned dimension of the uplink transmission provide the second feedback information; and communicating with the receiver based at least in part on the first feedback information and the second feedback information, wherein the two or more downlink transmission beams include at least a first beamformed signal and a second beamformed signal, the first beamformed signal and the second beamformed signal having different beamforming parameters, and the second feedback information indicates beam refinement information associated with the first beamformed signal and the second beamformed signal.

11. The method of claim 10, wherein the first beamformed signal and the second beamformed signal are transmitted in different tone beams that each correspond to a different beam direction of the associated SS block transmission, and the beam refinement information indicates a selected tone beam.

12. The method of claim 10, wherein the first partitioned dimension and the second partitioned dimension include partitions in one or more of:
a time resource dimension that includes a set of available time resources for the uplink transmission,
a frequency resource dimension including set of available frequency resources for the uplink transmission,
a root sequence dimension including a set of root sequences available for the uplink transmission,
a cyclic shift dimension including a set of cyclic shifts available for the uplink transmission,
a time-frequency dimension that includes a set of time-frequency resources available for the uplink transmission, or
any combination thereof.

13. The method of claim 12, wherein the frequency resource dimension includes independent or overlapping frequency resources associated with two or more partitions within the set of available frequency resources.

14. The method of claim 10, wherein the uplink transmission comprises a random access channel (RACH) message having a sequence derived from at least one of a set of root sequences, a set of cyclic shifts, a set of time-frequency resources, or any combination thereof, and
the first partitioned dimension includes a set of RACH resources for transmitting the RACH message, and a first partition of the first partitioned dimension corresponds to a first RACH resource of the set of RACH resources associated with a first downlink transmission beam, and
the second partitioned dimension includes two or more partitions in the set of root sequences, the set of cyclic shifts, the set of time-frequency resources, or any combination thereof.

15. The method of claim 10, further comprising: transmitting configuration information that indicates the first partitioned dimension and the second partitioned dimension and a range of feedback values associated each partition of each partitioned dimension.

16. The method of claim 15, wherein the configuration information is transmitted in a system information block (SIB).

17. An apparatus for wireless communication, comprising:
a processor;
memory in electronic communication with the processor; and
instructions stored in the memory and operable, when executed by the processor, to cause the apparatus to:
measure two or more downlink transmission beams from a transmitter in a beam sweep procedure via receiving the one or more downlink transmission beams in an associated synchronization signal (SS) block transmission, and wherein a first downlink transmission beam is associated with a first SS block transmission;
determine first feedback information and second feedback information based at least in part on the measuring, wherein the first feedback information indicates beam selection information and the second feedback information indicates beam refinement information; and
transmit an uplink communication that indicates the first feedback information and the second feedback information, wherein the uplink communication uses a first partition of a first partitioned dimension to indicate the first feedback information, and uses a second partition of a second partitioned dimension to indicate the second feedback information
wherein the two or more downlink transmission beams include at least a first beamformed signal and a second beamformed signal, the first beamformed signal and the second beamformed signal having different beamforming parameters, and
the first feedback information indicates a first downlink transmission beam of the two or more downlink transmission beams based at least in part on measurements of the two or more downlink transmission beams, and the second feedback information indicates the beam refinement information based at least in part on measurements of the first beamformed signal and the second beamformed signal within the first downlink transmission beam.

18. The apparatus of claim 17, wherein different partitions in each partitioned dimension correspond to different feedback information.

19. The apparatus of claim 17, wherein:
the first beamformed signal and the second beamformed signal within the first downlink transmission beam are transmitted in different tone beams each corresponding to a different beam direction of the first SS block transmission, and
the beam refinement information is based at least in part on a measured gain of each of the different tone beams.

20. An apparatus for wireless communication, comprising:
a processor;
memory in electronic communication with the processor; and
instructions stored in the memory and operable, when executed by the processor, to cause the apparatus to:
transmit two or more downlink transmission beams to a receiver in a beam sweep procedure via an associated synchronization signal (SS) block transmission, and wherein the first partitioned dimension includes a set of uplink time resources for transmitting the uplink transmission, each uplink time resource corresponding to a different partition of the first partitioned dimension, and each uplink time resource is associated with an SS block transmission, wherein of the two or more downlink transmission beams include at least a first beamformed signal and a second beamformed signal, the first beamformed signal and the second beamformed signal having different beamforming parameters, and the second feedback information indicates beam refinement information associated with the first beamformed signal and the second beamformed signal;

receive an uplink transmission from the receiver that includes first feedback information that indicates a first downlink transmission beam of the two or more downlink transmission beams and second feedback information that indicates beam refinement information associated with the first downlink transmission beam, wherein two or more partitions of a first partitioned dimension of the uplink transmission provide the first feedback information and two or more partitions of a second partitioned dimension of the uplink transmission provide the second feedback information; and communicate with the receiver based at least in part on the first feedback information and the second feedback information.

21. The apparatus of claim 20, wherein the first beamformed signal and the second beamformed signal are transmitted in different tone beams that each correspond to a different beam direction of the associated SS block transmission, and the beam refinement information indicates a selected tone beam.

22. The apparatus of claim 20, wherein the instructions are further operable to cause the apparatus to: transmit configuration information that indicates the first partitioned dimension and the second partitioned dimension and a range of feedback values associated each partition of each partitioned dimension.

* * * * *